(12) United States Patent
Langer

(10) Patent No.: US 11,321,136 B2
(45) Date of Patent: May 3, 2022

(54) TECHNIQUES FOR COLLECTIVE OPERATIONS IN DISTRIBUTED SYSTEMS

(71) Applicant: INTEL CORPORATION, Santa Clara, CA (US)

(72) Inventor: Akhil Langer, Champaign, IL (US)

(73) Assignee: INTEL CORPORATION, Santa Clara, CA (US)

( * ) Notice: Subject to any disclaimer, the term of this patent is extended or adjusted under 35 U.S.C. 154(b) by 363 days.

(21) Appl. No.: 15/856,538

(22) Filed: Dec. 28, 2017

(65) Prior Publication Data

US 2019/0042527 A1 Feb. 7, 2019

(51) Int. Cl.
```
G06F 9/50        (2006.01)
H04L 12/933      (2013.01)
G06F 9/46        (2006.01)
H04L 29/08       (2006.01)
G06F 15/173      (2006.01)
```
(Continued)

(52) U.S. Cl.
CPC ............ *G06F 9/5061* (2013.01); *G06F 9/465* (2013.01); *G06F 9/5027* (2013.01); *G06F 9/546* (2013.01); *G06F 15/17312* (2013.01); *G06F 15/17362* (2013.01); *H04L 45/04* (2013.01); *H04L 45/10* (2013.01); *H04L 45/54* (2013.01); *H04L 45/58* (2013.01); *H04L 45/60* (2013.01);
(Continued)

(58) Field of Classification Search
CPC .... G06F 15/17312; G06F 9/465; G06F 9/546; G06F 15/17362; G06F 9/46; G06F 9/5061–5077; G06F 9/5027; H04L 45/10; H04L 45/54; H04L 45/58; H04L 45/60; H04L 49/102; H04L 49/15; H04L 67/10; H04L 45/04; H04L 29/08135

USPC ......................................................... 709/238
See application file for complete search history.

(56) References Cited

U.S. PATENT DOCUMENTS 5,535,213 A * 7/1996 Pan ..................... H04L 12/4637
                                                      370/258
6,178,531 B1 * 1/2001 Kolb ....................... H04L 43/50
                                                      370/253
(Continued)

FOREIGN PATENT DOCUMENTS

FR       3015719 A1 *  6/2015 ............ G06F 11/261
WO  WO-2016028545 A1 *  2/2016 ......... H04L 41/0803

OTHER PUBLICATIONS

Jain et al., "Collectives on two-tier direct networks" In European MPI Users' Group Meeting, Springer Berlin Heidelberg, 2012, 12 pages.

(Continued)

*Primary Examiner* — Joshua Kading
(74) *Attorney, Agent, or Firm* — KDB Firm PLLC

(57) ABSTRACT

Various embodiments are generally directed to techniques for collective operations among compute nodes in a distributed processing set, such as by utilizing ring sets and local sets of the distributed processing set. In some embodiments, a ring set may include a subset of the distributed processing set in which each compute node is connected to a network with a separate router. In various embodiments, a local set may include a subset of the distributed processing set in which each compute node is connected to a network with a common router. In one or more embodiments, each compute node in a distributed processing set may belong to one ring set and one local set.

22 Claims, 16 Drawing Sheets

(51) Int. Cl.
  *H04L 12/775* (2013.01)
  *H04L 45/00* (2022.01)
  *G06F 9/54* (2006.01)
  *H04L 49/102* (2022.01)
  *H04L 49/15* (2022.01)
  *H04L 45/58* (2022.01)
  *H04L 45/60* (2022.01)
  *H04L 67/10* (2022.01)

(52) U.S. Cl.
  CPC ............ *H04L 49/102* (2013.01); *H04L 49/15* (2013.01); *H04L 67/10* (2013.01)

(56) References Cited

U.S. PATENT DOCUMENTS

| | | | | |
|---|---|---|---|---|
| 7,831,709 | B1* | 11/2010 | Ham | H04L 41/0853 709/224 |
| 8,447,757 | B1* | 5/2013 | Cox | G06F 16/2471 707/720 |
| 9,912,741 | B2* | 3/2018 | Birkestrand | H04L 67/10 |
| 10,009,044 | B1* | 6/2018 | Lazier | H04L 67/10 |
| 10,218,611 | B2* | 2/2019 | Easale | H04L 45/507 |
| 2003/0195938 | A1* | 10/2003 | Howard | G06F 9/5044 709/208 |
| 2013/0166749 | A1* | 6/2013 | Kruglick | H04L 47/125 709/226 |
| 2013/0173740 | A1* | 7/2013 | Jea | G06F 15/17331 709/216 |
| 2014/0122560 | A1* | 5/2014 | Ramey | H04L 67/1008 709/201 |
| 2015/0117276 | A1* | 4/2015 | Hu | H04L 5/0053 370/280 |
| 2015/0163287 | A1* | 6/2015 | Gooding | G06F 9/5016 709/201 |
| 2015/0188817 | A1* | 7/2015 | Parker | H04L 45/10 709/238 |
| 2016/0012002 | A1* | 1/2016 | Arimilli | G06F 13/4027 710/306 |
| 2016/0012004 | A1* | 1/2016 | Arimilli | G06F 13/4027 710/306 |
| 2016/0085587 | A1* | 3/2016 | Dube | G06F 9/5005 718/104 |
| 2016/0212202 | A1* | 7/2016 | Birkestrand | H04L 67/1008 |
| 2016/0239415 | A1* | 8/2016 | Davis | H04L 49/201 |
| 2016/0294694 | A1* | 10/2016 | Parker | H04L 45/745 |
| 2017/0193136 | A1* | 7/2017 | Prasad | G06F 30/327 |
| 2018/0287964 | A1* | 10/2018 | Gray | H04L 49/109 |
| 2021/0073023 | A1* | 3/2021 | Chen | G06F 9/455 |

OTHER PUBLICATIONS

Thakur et al., "Optimization of collective communication operations in MPICH", The International Journal of High Performance Computing Applications, 19(1), 2005, 18 pages.
Prisacari et al., "Generalized Hierarchical All-to-all Exchange Patterns" In Parallel & Distributed Processing (IPDPS), IEEE 27th International Symposium on, pp. 537-547. IEEE, 2013, 11 pages.
Dorier et al., "Evaluation of Topology-Aware Broadcast Algorithms for Dragonf ly Networks" Cluster Computing (Cluster), IEEE International Conference on IEEE, 2016, 11 pages.

\* cited by examiner

*100*

300A

400

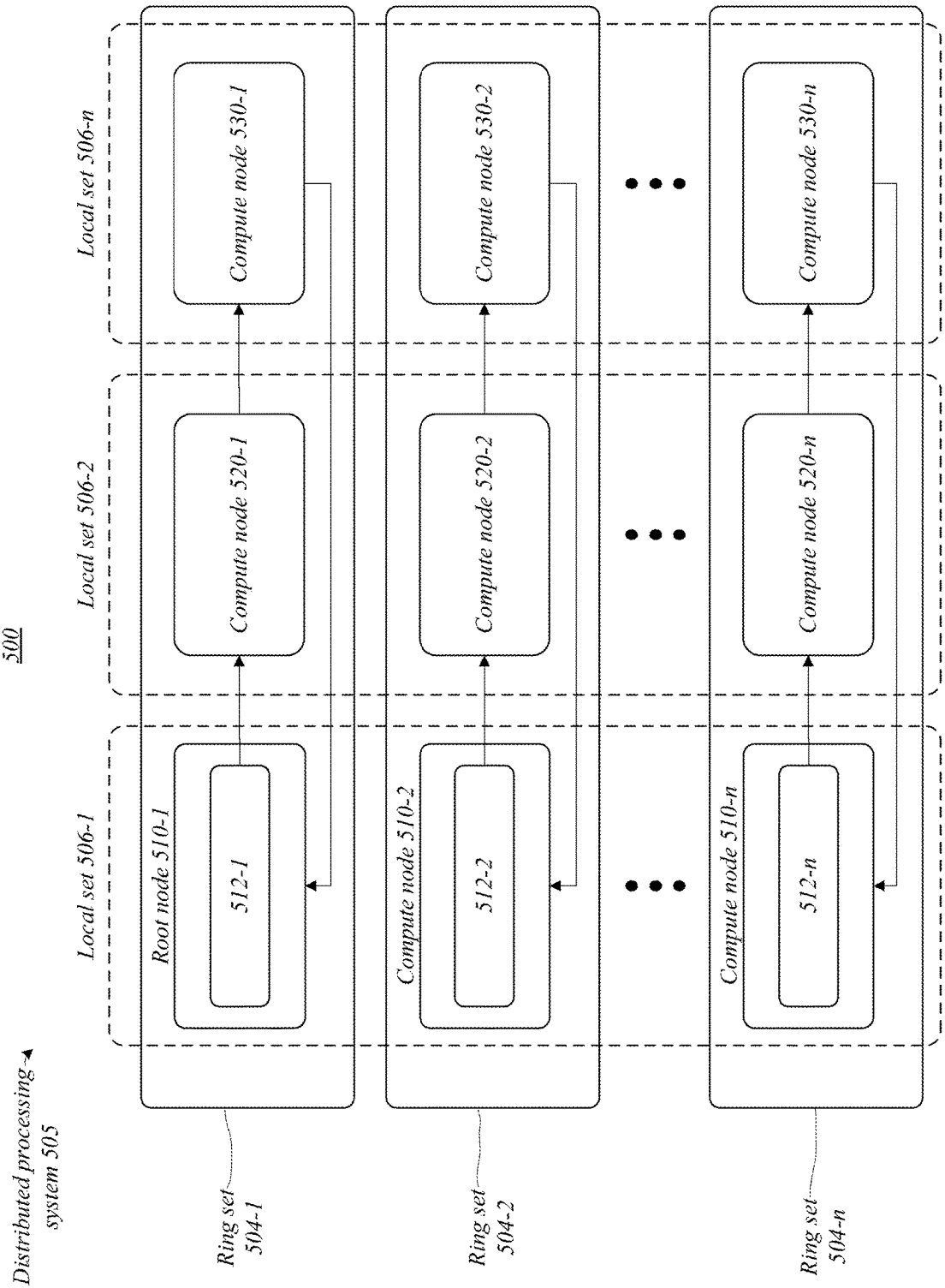

Identify a dataset for distributed computing operations among a distributed processing set of compute nodes
602

Distribute a first portion of the dataset to a second compute node in a local set that includes the first compute node, the local set comprising a first subset of the distributed processing set, wherein each compute node in the local set is connected to a network with a common router
604

Distribute a second portion of the data set to a third compute node in a ring set that includes the first compute node, the ring set comprising a second subset of the distributed processing set of compute nodes, wherein each compute node in the ring set is connected to the network with a separate router
606

FIG. 7

Storage Medium 700

Computer Executable Instructions for 400

Computer Executable Instructions for 500

Computer Executable Instructions for 600

TECHNIQUES FOR COLLECTIVE OPERATIONS IN DISTRIBUTED SYSTEMS

GOVERNMENT CONTRACT NOTICE

This invention was made with Government support under contract number B609815 awarded by the Department of Energy. The Government has certain rights in this invention.

BACKGROUND

Distributed processing or distributed computing generally refers to a field of computer science that studies and/or utilizes distributed systems. For instance, distributed computing may include the use of distributed systems to solve computational problems. A distributed system may refer to a model in which components located on networked computers communicate and coordinate their actions by passing messages. Typically, the components of a distributed system interact with each other to achieve a common goal. For example, a problem may be divided into many tasks, each of which is solved by one or more computers in the distributed system that communicate with each other by message passing.

BRIEF DESCRIPTION OF THE DRAWINGS

FIGS. 5A-5D illustrates an embodiment of a second logic flow.

FIG. 6 illustrates an embodiment of a third logic flow.

FIG. 7 illustrates an embodiment of a storage medium.

DETAILED DESCRIPTION

Figure 1:
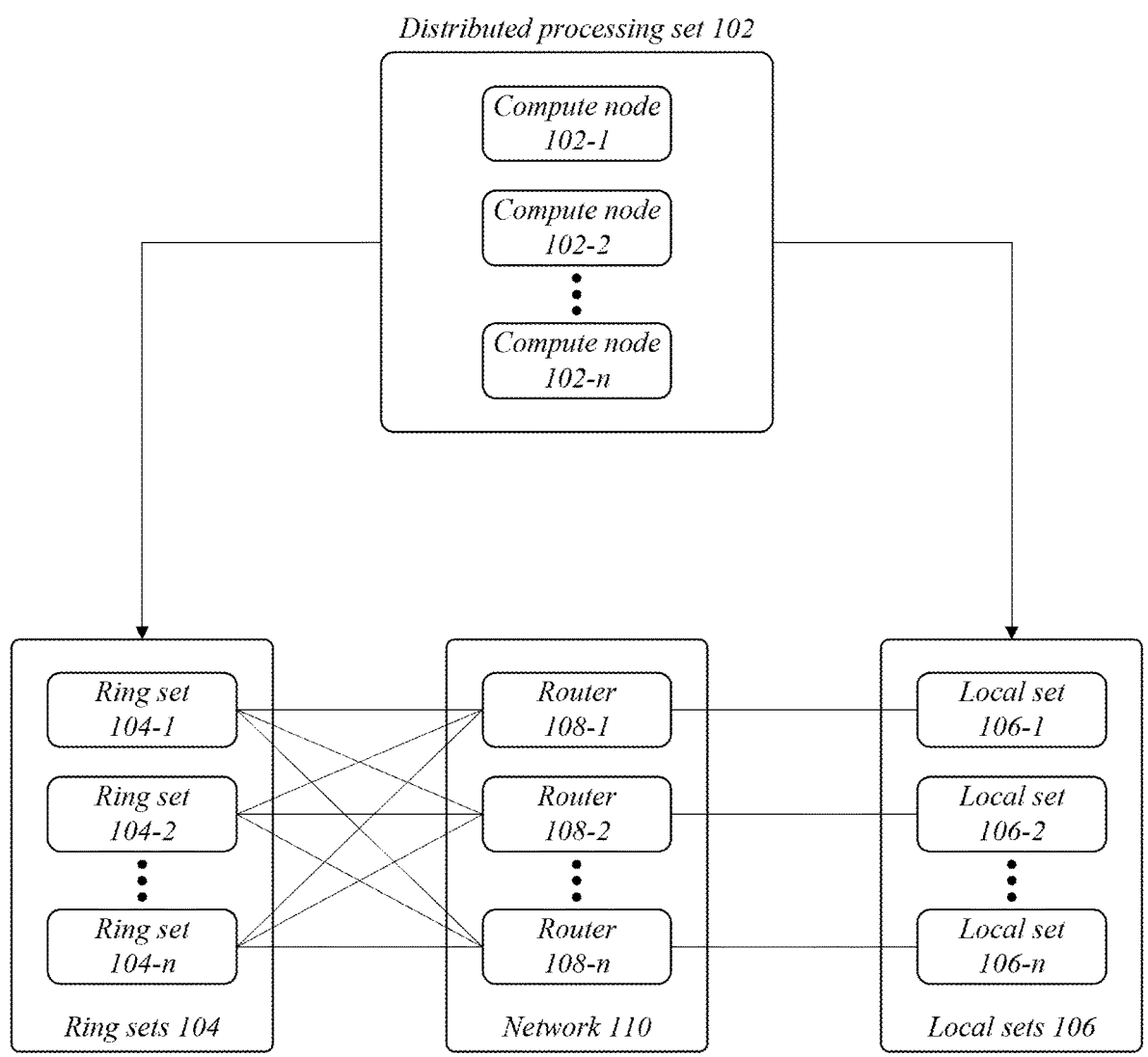
FIG. 1 illustrates an embodiment of a first operating environment.

Various embodiments are generally directed to techniques for collective operations among compute nodes in a distributed processing set, such as by utilizing ring sets and local sets of the distributed processing set. In some embodiments, a ring set may include a subset of the distributed processing set in which each compute node is connected to a network with a separate router. In various embodiments, a local set may include a subset of the distributed processing set in which each compute node is connected to a network with a common router. In one or more embodiments, each compute node in a distributed processing set may belong to one ring set and one local set.

Some embodiments are particularly directed to a distributed processing system that performs collective operations, such as large message collective operations, using ring sets that each include a separate edge disjoint ring or chain. In some such embodiments, data may be pushed or driven simultaneously through each ring set (also referred to as chain or chain set) without creating network contention. In one embodiment, for example, an apparatus for distributed processing may comprise a memory and logic for a first compute node, at least a portion of the logic implemented in circuitry coupled to the memory. In various embodiments, the logic may identify a dataset for distributed computing operations among a distributed processing set of compute nodes. In some embodiments, the logic may distribute a first portion of the dataset to a second compute node in a local set that includes the first compute node, the local set comprising a first subset of the distributed processing set and including the first and second compute nodes, wherein each compute node in the local set is connected to a network with a common router. In one or more embodiments, the logic may distribute a second portion of the data set to a third compute node in a ring set that includes the first compute node, the ring set comprising a second subset of the distributed processing set of compute nodes, wherein each compute node in the ring set is connected to the network with a separate router. These and other embodiments are described and claimed.

Some challenges facing distributed processing systems include the inability to distribute information among compute nodes without poor network bandwidth utilization. These challenges may result from poorly designed systems that cannot perform collective operations in an efficient or coordinated manner. In such embodiments, distributed processing systems may use inept methods for collective operations. Adding further complexity, multiple compute nodes in a distributed processing set may attempt to simultaneously send data to one or more other compute nodes in the distributed processing set. In various embodiments, this can lead to network contention. For example, different messages may collide or interfere with each other, resulting in inefficient network utilization. These and other factors may result in a distributed processing system with poor efficiency and limited functionality. Such limitations can reduce performance in a distributed processing system, contributing to ineffective systems with poor network utilization and limited capabilities.

Various embodiments described herein include a distributed processing system that can have a lesser cost than other methods for distributing information among various compute nodes in a distributed processing set, such as in performing collective operations. For example, and, as described in more detail below (see e.g., FIGS. 5A-5C), various embodiments may utilize a method for AlltoAll collective operations that can be carried out 16 times faster than other methods for AlltoAll collective operations. In some embodiments, the distributed processing system may avoid network contention when distributing information. For instance, data may be simultaneously driven through one or more ring sets without creating network contention while maximally utilizing available network bandwidth. In one or more embodiments, each of the one or more ring sets may include an edge disjoint ring. For example, the distributed processing system may form one or more edge disjoint rings (e.g., ring set) in a multi-tier direct (or dragonfly) network topology such that there is no network contention among any link across the one or more edge disjoint rings. In various embodiments, the distributed processing system may efficiently utilize direct connections between routers (or switches) in a dragonfly network topology. In various such embodiments, the distributed processing system may adapt algorithms, such as recursive doubling, ring, etc. to map to a dragonfly network topology. In some embodiments, the distributed processing system may utilize one or more hierarchical ring algorithms for various information distribution operations, such as collective operations on a dragonfly network topology. In these and other ways, the distributed processing system may enable reliable and efficient network utilization to achieve improved information distribution among compute nodes in the distributed processing system, such as by reducing or eliminating network contention caused by collective operations, resulting in several technical effects and advantages.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an example of an operating environment 100 that may be representative of various embodiments. Operating environment 100 may include distributed processing set 102, ring sets 104, local sets 106, and network 110. In the illustrated embodiments, ring sets 104 and local sets 106 are subsets of the distributed processing set 102. Accordingly, each of ring sets 104 and local sets 106 may include one or more of compute nodes 102-1, 102-2, 102-$n$ (or compute nodes 102). In many embodiments, each of compute nodes 102 may communicatively couple with network 110 via one of routers 108-1, 108-2, 108-$n$ (or routers 108). In one or more embodiments, each compute node in distributed processing set 102 may belong to at least one ring set and at least one local set. Various embodiments described herein may create and/or utilize one or more of ring sets 104 and local sets 106 to implement hierarchical ring algorithms for various information distribution operations on network 110. Embodiments are not limited in this context.

In one or more embodiments, the components of operating environment 100 may function to form and/or utilize ring sets 104 and local sets 106 out of distributed processing set 102 to perform large collective operations on a multi-tier direct (or dragonfly) network topology. Accordingly, in some embodiments, network 110 may operate with a dragon fly topology. In some such embodiments, each router (or switch) in network 110 is directly connected with every other router.

In various embodiments, each of ring sets 104 may comprise an edge disjoint ring. In various such embodiments, no two ring sets may share an edge. In other words, an independent communication path around a loop formed with each compute node in each ring set may exist. In many embodiments, this may enable data to be driven simultaneously through each ring set without creating contention on network 110. In one or more embodiments described herein, data may be distributed in a two-step fashion. For example, data may first be distributed through each ring set and then data may be distributed among each local set. In some embodiments, each compute node may belong to exactly one ring set and exactly one local set. In various embodiments, each compute node in a ring set may communicatively couple with network 110 via a separate router. In some embodiments, each compute node in a local set may communicatively couple with network 110 via a common router.

Figure 2A:
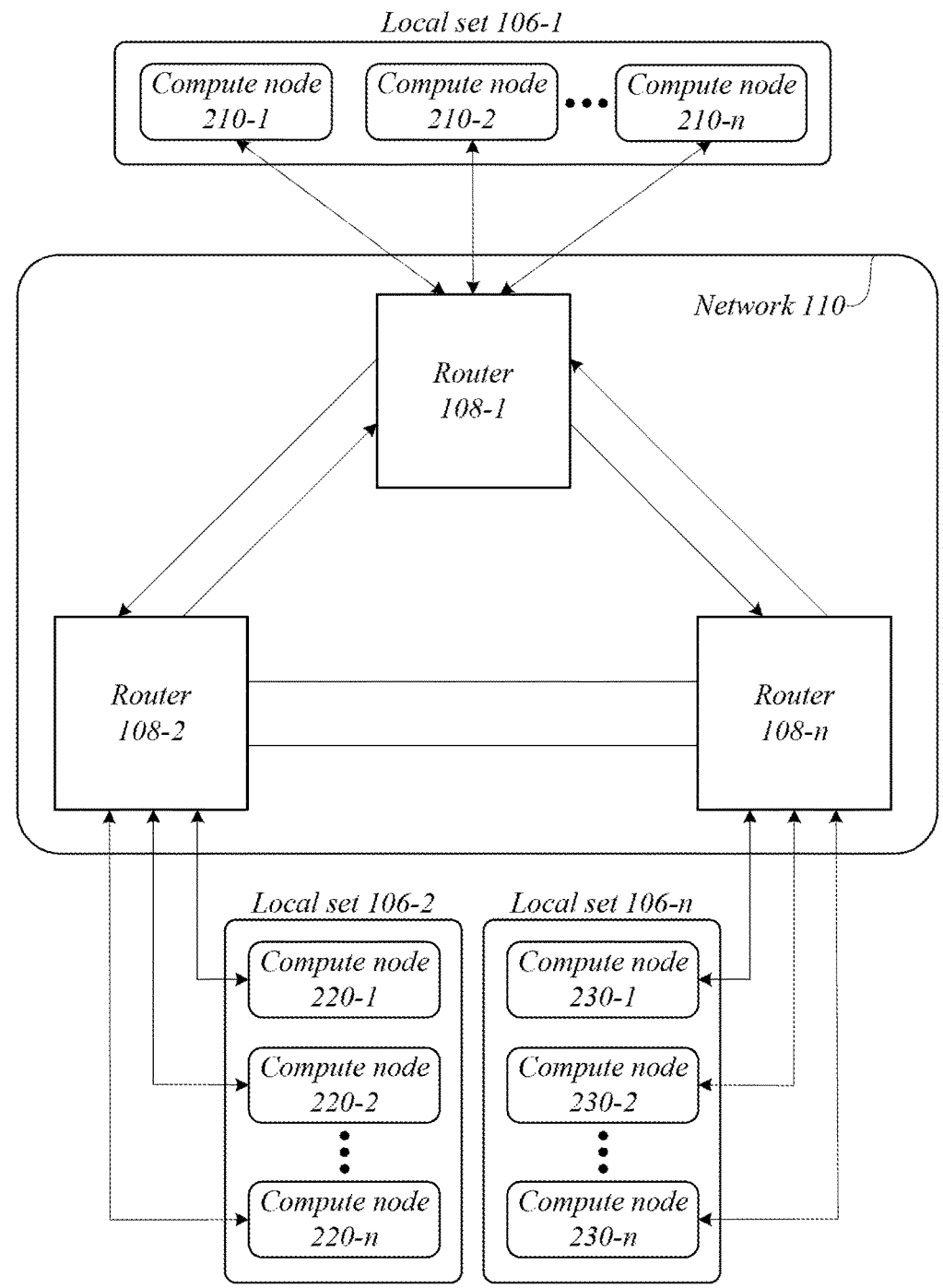
FIGS. 2A-2B illustrate an embodiment of a second operating environment.
Figure 2B:
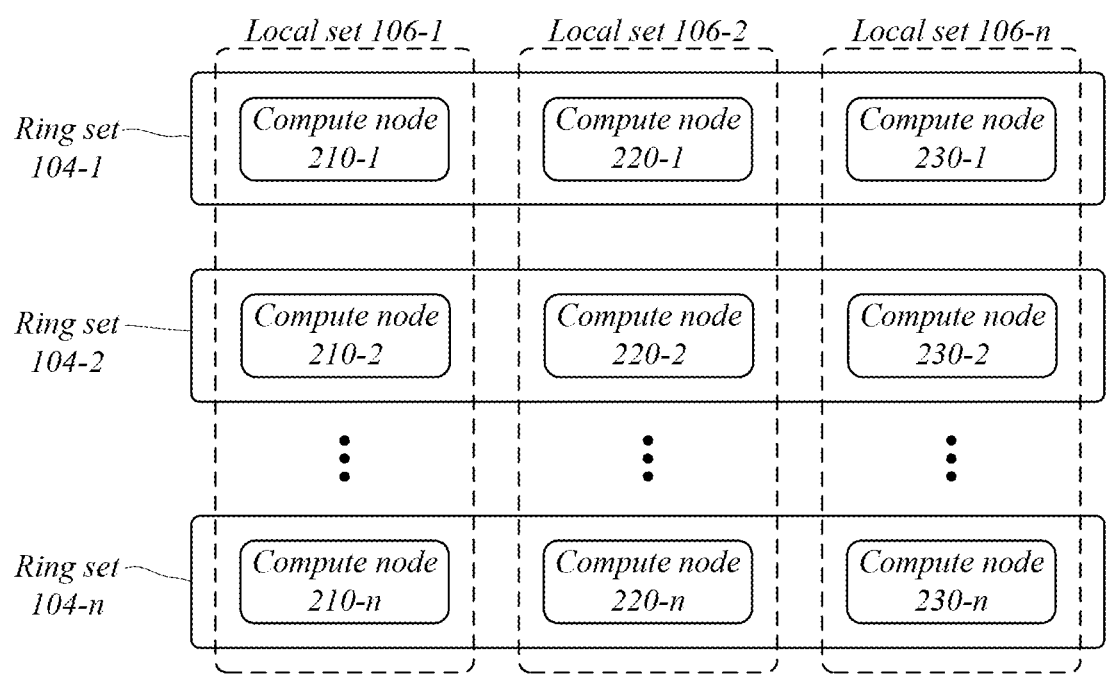

FIG. 2A-2B illustrates an example of an operating environment 200 that may be representative of various embodiments. Operating environment 200 may include distributed processing system 205. As shown in FIG. 2A, distributed processing system 205 may include one or more local sets 106-1, 106-2, 106-$n$. In the illustrated embodiment, local set 106-1 may include one or more compute nodes 210-1, 210-2, 210-$n$ (or compute nodes 210), local set 106-2 may include one or more compute nodes 220-1, 220-2, 220-$n$ (or compute nodes 220), and local set 106-$n$ may include one or more compute nodes 230-1, 230-2, 230-$n$ (or compute nodes 230). In various embodiments, local set 106-1 may communicatively couple with network 110 via router 108-1, local set 106-2 may communicatively couple with network 110 via router 108-2, and local set 106-$n$ may communicatively couple with network 110 via router 108-$n$. As shown in FIG. 2B, compute nodes 210, 220, 230 may comprise distributed processing set 202. In the illustrated embodiments, each compute node belongs to one local set and one ring set. Accordingly, ring set 104-1 may include compute nodes 210-1, 220-1, 230-1, ring set 104-2 may include compute nodes 210-2, 220-2, 230-2, and ring set 104-$n$ may include compute nodes 210-$n$, 220-$n$, 230-$n$. Embodiments are not limited in this context.

Various embodiments described herein include distributed processing system 205 that may distribute information among various compute nodes in distributed processing set 202, such as in performing collective operations. In some embodiments, the distributed processing system 205 may avoid network contention when distributing information. For instance, data may be simultaneously driven through each of one or more ring sets 104-1, 104-2, 104-$n$ without creating contention while maximally utilizing available bandwidth in network 110. In one or more embodiments, each of the one or more ring sets 104 may include an edge disjoint ring. For example, the distributed processing system may form one or more edge disjoint rings in a multi-tier direct (or dragonfly) network topology such that there is no network contention among any link across the one or more edge disjoint rings. In various embodiments, the distributed processing system may efficiently utilize direct connections between routers 108 in a dragonfly network topology. In various such embodiments, the distributed processing system 205 may adapt algorithms, such as recursive doubling, ring, etc. to map to a dragonfly network topology in network 110. In some embodiments, the distributed processing system may utilize one or more hierarchical ring algorithms for various information distribution operations, such as collective operations on a dragonfly network topology.

In one or more embodiments, data may be distributed in a two-step fashion. For example, data may first be distributed through each ring set and then data may be distributed among each local set. In some embodiments, each compute node may belong to exactly one ring set and exactly one local set. In various embodiments, each compute node in a ring set may communicatively couple with network 110 via a separate router. In some embodiments, each compute node in a local set may communicatively couple with network 110 via a common router. In one or more embodiments, methods for performing collective operations using the sets of compute nodes. In various embodiments, such as for ease of understanding, cases in which the collective operations are performed by all of the nodes are considered. However, it will be appreciated that information distribution may occur, such as utilizing one or more operations described herein, among any subset of compute nodes in distributed processing set 202. Additionally, or alternatively, one or more compute nodes in distributed processing set 202 may belong to only one of a local set and a ring set. For instance, a compute node may belong to a local set, but not a ring set, such that it relies on another node in the local set belonging to a ring set to participate in distributed processing operations.

As will be described in more detail below, such as in conjunction with FIGS. 3A-3B, one or more distributed processing system described herein may utilize a dragonfly topology with a number of routers, n, that have direct connections to each other. In such embodiments, n−1 edge disjoint rings may be formed when n is odd and n−2 edge disjoint rings may be formed when n is even. In some embodiments, ring sets 104 may include a ring set corresponding to each of the edge disjoint rings that may be formed, such that a corresponding ring set includes each compute node used to form the corresponding edge disjoint ring, for instance.

Figure 3A:
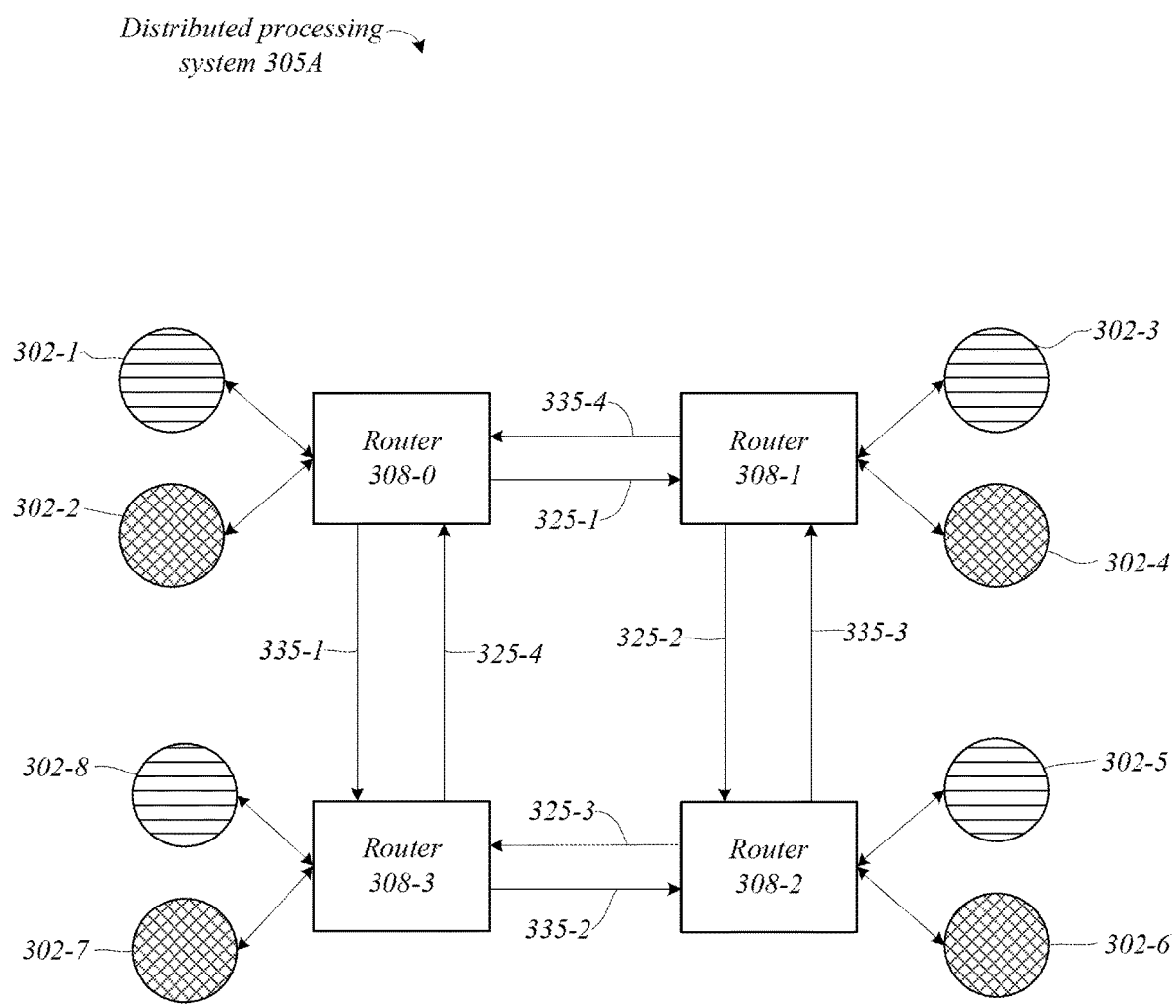
FIG. 3A illustrates an embodiment of a third operating environment.

FIG. 3A illustrates an example of an operating environment 300A that may be representative of various embodiments. Operating environment 300A may include distributed processing system 305A with compute nodes 302-1, 302-2, 302-3, 302-4, 302-5, 302-6, 302-7, 302-8 (or compute nodes 302) and routers 308-0, 308-1, 308-2, 308-3 (or routers 308). In many embodiments, distributed processing system 305A may be the same or similar as distributed processing system 205. In some embodiments, routers 308 may not be considered a portion of distributed processing system 305A. In other embodiments, compute nodes 302 may not be considered a portion of distributed processing system 305A. In one or more embodiments described herein, FIG. 3A may illustrate the edge disjoint rings that may be formed among routers 308. In the illustrated embodiments, a first ring set may include compute nodes with horizontal striping and a second ring set may include compute nodes with cross hatching. Additionally, compute nodes 302-1, 302-2 may form a first local set, compute nodes 302-3, 302-4 may form a second local set, compute nodes 302-5, 302-6 may form a third local set, and compute nodes 302-7, 302-8 may form a fourth local set. Embodiments are not limited in this context.

As previously mentioned, one or more distributed processing system described herein may utilize a dragonfly topology with a number of routers, n, that have direct connections to each other. In such embodiments, n−1 edge disjoint rings may be formed when n is odd and n−2 edge disjoint rings may be formed when n is even. In distributed processing system 305A, the number of routers 308 may be four such that n is four, and because four is even, two edge disjoint rings may be formed. Thus, the horizontal-striping ring set and the cross-hatching ring set may be formed in operating environment 300A.

In one or more embodiments, the horizontal-striping ring set may utilize a first communication pathway and the cross-hatching ring set may utilize a second communication pathway. In one or more such embodiments, the first and second communication pathways may be independent such that they can be simultaneously used without creating network contention. In various embodiments, the first communication pathway may include communication links 325-1, 325-2, 325-3, 325-4 and second communication pathway may include communication links 335-1, 335-2, 335-3, 335-4. In one or more embodiments described herein, network 110 may include one or more of routers 308, and communication links 325, 335. In many embodiments, communication links 325, 335 may include direct communication pathways between sets of routers. In many such embodiments, the direct communication pathways may be unidirectional and/or implemented in a unidirectional manner.

In some embodiments, the first communication pathway may proceed from compute node 302-1 to compute node 302-3 via communication link 325-1, then from compute node 302-3 to compute node 302-5 via communication link 325-2, then from compute node 302-5 to compute node 302-8 via communication link 325-3, and finally from compute node 302-8 to compute node 302-1. In some such embodiments, the first communication pathway may correspond to a first edge disjoint ring formed with the horizontal-striping ring set. In various embodiments, the second communication pathway may proceed from compute node 302-2 to compute node 302-7 via communication link 335-1, then from compute node 302-7 to compute node 302-6 via communication link 335-2, then from compute node 302-6 to compute node 302-4 via communication link 335-3, and finally from compute node 302-4 to compute node 302-2. In various such embodiments, the second communication pathway may correspond to a second edge disjoint ring formed with the cross-hatching ring set.

In one or more embodiments, once data has been distributed through each ring set, data may be distributed among each local set. For example, compute nodes 302-1, 302-2 may exchange information, compute nodes 302-3, 302-4 may exchange information, compute nodes 302-5, 302-6 may exchange information, and compute nodes 302-7, 302-8 may exchange information. As illustrated in FIG. 3A, each compute node in a ring set may be communicatively coupled to a network via a separate router and each compute node in a local set may be communicatively coupled to the network via a common router. For instance, horizontal-striping ring set may include compute node 302-1 connected via router 308-0, compute node 302-3 connected via router 308-1, compute node 302-5 connected via router 308-2, and compute node 302-8 connected via router 308-3. In another instance, a local set may include compute nodes 302-1, 302-2 connected via router 308-0.

Figure 3B:
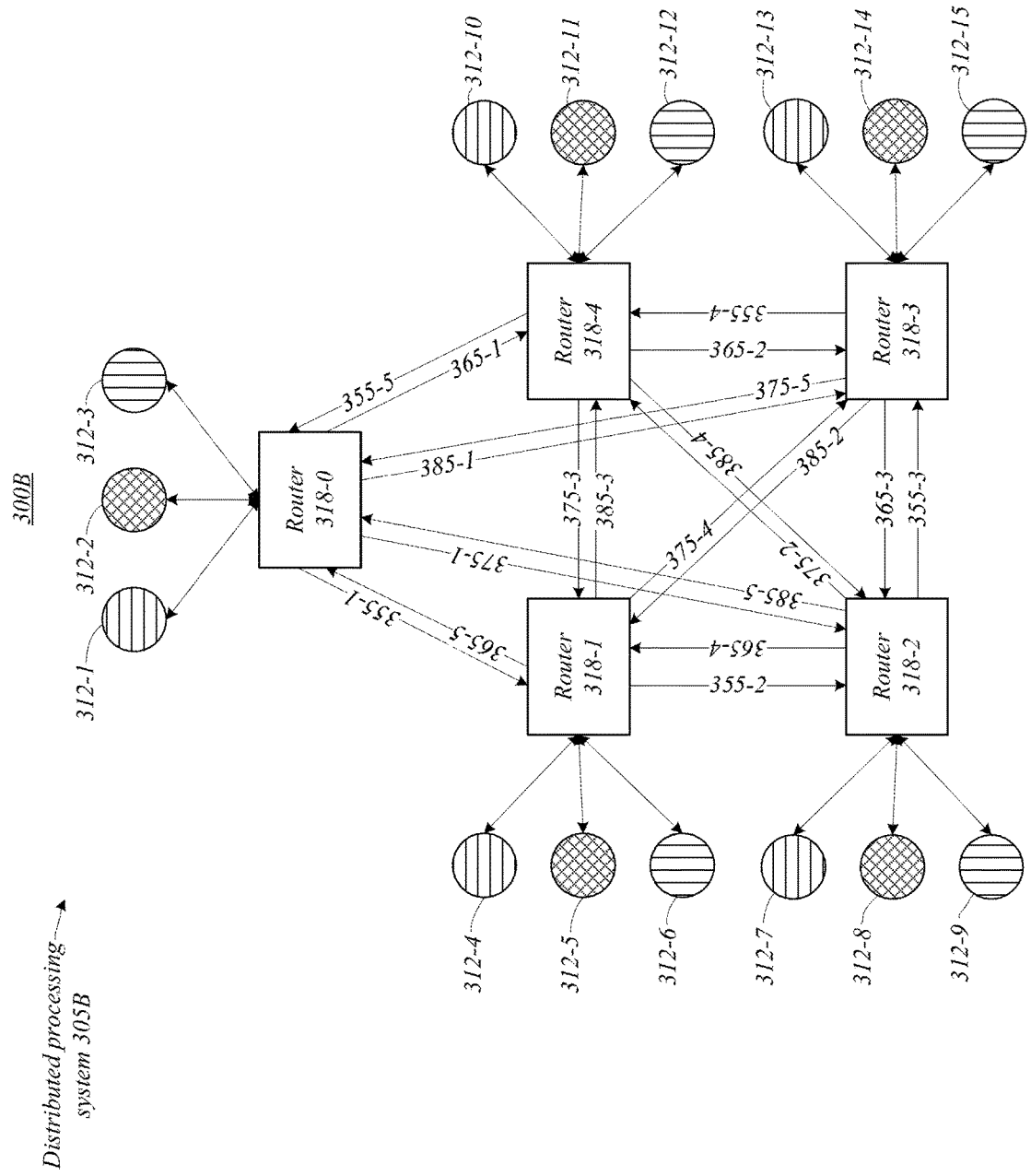
FIG. 3B illustrates an embodiment of a fourth operating environment.

FIG. 3B illustrates an example of an operating environment 300B that may be representative of various embodiments. Operating environment 300B may include distributed processing system 305B with compute nodes 312-1, 312-2, 312-3, 312-4, 312-5, 312-6, 312-7, 312-8, 312-9, 312-10, 312-11, 312-12, 312-13, 312-14, 312-15, (or compute nodes 312) and routers 318-0, 318-1, 318-2, 318-3, 318-4 (or routers 318). In many embodiments, distributed processing system 305A may be the same or similar as distributed processing system 205. In some embodiments, routers 318 may not be considered a portion of distributed processing system 305B. In other embodiments, compute nodes 312 may not be considered a portion of distributed processing system 305B. In one or more embodiments described herein, FIG. 3B may illustrate the edge disjoint rings that may be formed among routers 318. In the illustrated embodiments, a first ring set may include compute nodes with horizontal striping, a second ring set may include compute nodes with cross hatching, and a third ring set may include compute nodes with vertical striping. Additionally, compute nodes 312-1, 312-2, 312-3 may form a first local set, compute nodes 312-4, 312-5, 312-6 may form a second local set, compute nodes 312-7, 312-8, 312-9 may form a third local set, compute nodes 312-10, 312-11, 312-12 may form a fourth local set, and compute nodes 312-13, 312-14, 312-15 may form a fifth local set. Embodiments are not limited in this context.

In some embodiments, one or more distributed processing system described herein may utilize a dragonfly topology with a number of routers, n, that have direct connections to each other. In such embodiments, n−1 edge disjoint rings may be formed when n is odd and n−2 edge disjoint rings may be formed when n is even. In distributed processing system 305B, the number of routers 318 may be five such that n is five, and because vide is odd, four edge disjoint rings may be formed. It will be appreciated that in FIG. 3B only three of the four edge disjoint rings include compute nodes, however, a fourth compute node could be added to each local set to create a ring set that would utilize the fourth edge disjoint ring. Thus, the illustrated embodiment may include the horizontal-striping ring set, the cross-hatching ring set, and the vertical-striping may be formed in operating environment 300B.

In one or more embodiments, the horizontal-striping ring set may utilize a first communication pathway, the cross-hatching ring set may utilize a second communication pathway, and the vertical-striping ring set may utilize a third communication pathway. In one or more such embodiments, the first, second, and third communication pathways may be independent such that they can be simultaneously used without creating network contention. In some embodiments, another ring set (not illustrated) may utilize a fourth communication pathway. In some such embodiments, the first, second, third, and fourth communication pathways may be independent such that they can be simultaneously used without creating network contention. In various embodiments, the first communication pathway may include communication links 355-1, 355-2, 355-3, 355-4, 355-5, the second communication pathway may include communication links 365-1, 365-2, 365-3, 365-4, 365-5, the third communication pathway may include communication links 375-1, 375-2, 375-3, 375-4, 375-5, and the fourth communication pathway may include communication links 385-1, 385-2, 385-3, 385-4, 385-5. In one or more embodiments described herein, network 110 may include one or more of routers 318, and communication links 355, 365, 375, 385. In many embodiments, communication links 355, 365, 375, 385 may include direct communication pathways between sets of routers. In many such embodiments, the direct communication pathways may be unidirectional and/or implemented in a unidirectional manner.

In some embodiments, the first communication pathway may proceed from compute node 312-1 to compute node 312-4 via communication link 355-1, then from compute node 312-4 to compute node 312-7 via communication link 355-2, then from compute node 312-7 to compute node 312-13 via communication link 355-3, then from compute node 312-13 to compute node 312-10 via communication link 355-4, and finally from compute node 312-10 to compute node 312-1 via communication link 355-5. In some such embodiments, the first communication pathway may correspond to a first edge disjoint ring formed with the horizontal-striping ring set. In various embodiments, the second communication pathway may proceed from compute node 312-2 to compute node 312-11 via communication link 365-1, then from compute node 312-11 to compute node 312-14 via communication link 365-2, then from compute node 312-14 to compute node 312-8 via communication link 365-3, then from compute node 312-8 to compute node 312-5 via communication link 365-4, and finally from compute node 312-5 to compute node 312-2 via communication link 365-5. In various such embodiments, the second communication pathway may correspond to a second edge disjoint ring formed with the cross-hatching ring set.

In one or more embodiments, the third communication pathway may proceed from compute node 312-3 to compute node 312-9 via communication link 375-1, then from compute node 312-9 to compute node 312-12 via communication link 375-2, then from compute node 312-12 to compute node 312-6 via communication link 375-3, then from compute node 312-6 to compute node 312-15 via communication link 375-4, and finally from compute node 312-15 to compute node 312-3 via communication link 375-5. In one or more such embodiments, the first communication pathway may correspond to a third edge disjoint ring formed with the vertical-striping ring set.

In one or more embodiments, once data has been distributed through each ring set, data may be distributed among each local set. For example, compute nodes 312-1, 312-2, 312-3 may exchange information, compute nodes 312-4, 312-5, 312-6 may exchange information, compute nodes 312-7, 312-8, 312-9 may exchange information, compute nodes 312-10, 312-11, 312-12 may exchange information, and compute nodes 312-13, 312-14, 312-15 may exchange information. As illustrated in FIG. 3B, each compute node in a ring set may be communicatively coupled to a network via a separate router and each compute node in a local set may be communicatively coupled to the network via a common router. For instance, horizontal-striping ring set may include compute node 312-1 connected via router 318-0, compute node 312-4 connected via router 318-1, compute node 312-7 connected via router 318-2, compute node 312-13 connected via router 318-3, and compute node 312-10 connected via router 318-4. In another instance, a local set may include compute nodes 312-1, 312-2, 312-3 connected via router 318-0.

In the following descriptions, such as regarding the logic flows of FIG. 3A to FIG. 6, methods for various collective operations are described in more detail. In these embodiments, one or more of the following representations shown in Table 1 below may be used.

TABLE 1

| Symbol | Description |
| --- | --- |
| a (or A) | Number of routers |
| p | Number of computing nodes per router |
| n | Total number of nodes (=a*p) |
| α | Network latency |
| β | Network bandwidth (in secs/byte) |
| m | Message size |
| γ | Copying cost |
| δ | Reduction cost |
| s | Segment size |

In various embodiments, edge disjoint rings may be generated, such as by one or more components of distributed processing systems described herein, as follows. For example, when A is odd, in ring I, router j may be followed by router (j+i+1)% A. In another example, when A is even, the edge disjoint rings (wherein the $i^{th}$ ring is $R_i^A$) can be obtained from the rings of A−1 routers ($R_i^{A-1}$). In such instances, since A−1 is odd, its rings ($R_i^{A-1}$ for I in {1, A−1}) may be obtained by the formula for an odd number of routers given above. In further such instances, $R_i^A$ may then be obtained by inserting $(A-1)^{th}$ router after $(i+1)^{th}$ router in $R_i^{A-1}$. In these instances, rings for a dragon fly topology with 6 routers may include the following:

0→1→5→2→3→4→0
0→2→5→4→1→3→0
0→3→5→1→4→2→0
0→4→5→3→2→1→0

Some embodiments may include a balanced dragonfly topology. In some such embodiments, a balanced dragonfly topology may adhere to $\alpha=2p^7$. Therefore, there may be enough nodes to drive data through these rings simultaneously by assigning one node in each router to each of these rings. Further, these rings can be used to perform one or more information distribution operations, such as collectives, in a contention avoiding manner.

Figure 4A:
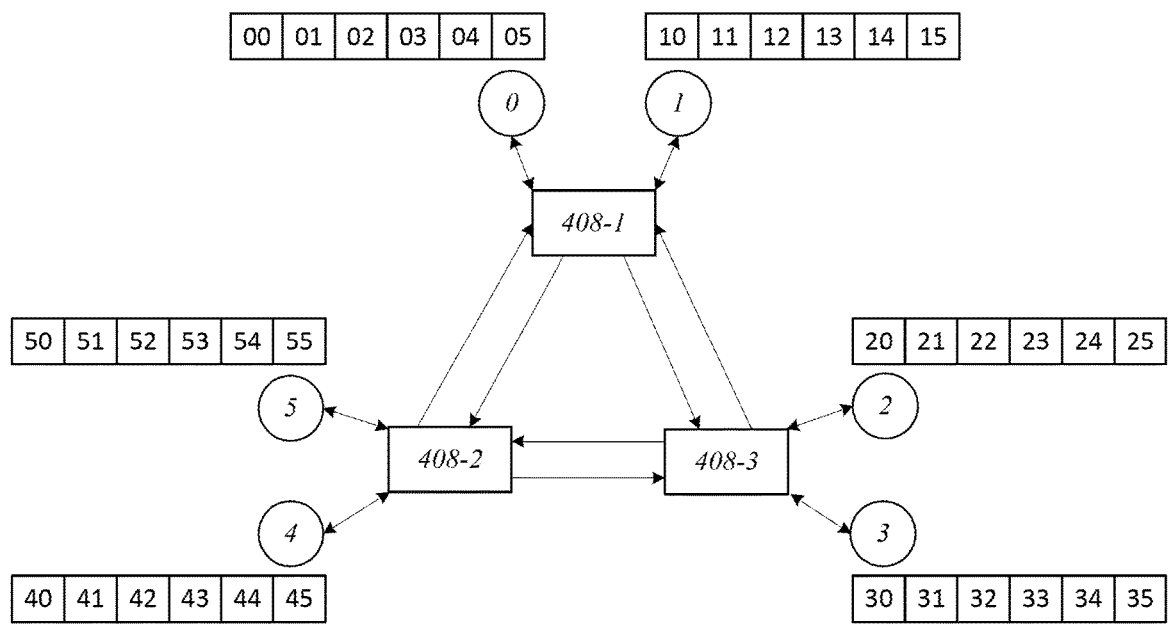
FIGS. 4A-4C illustrate an embodiment of a first logic flow
Figure 4B:
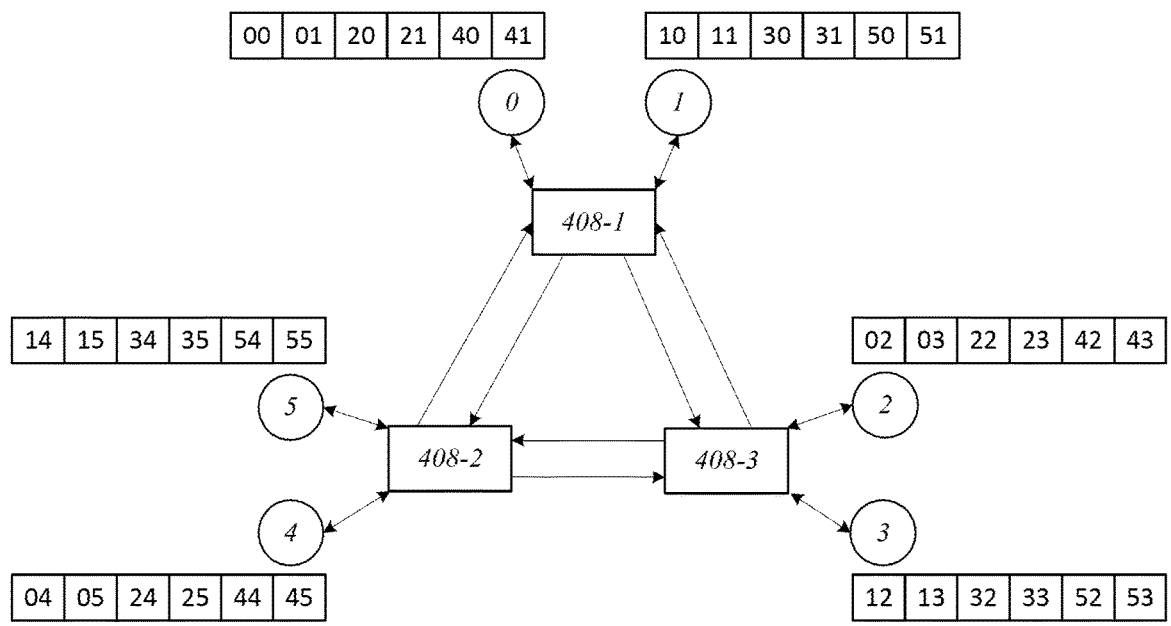
Figure 4C:
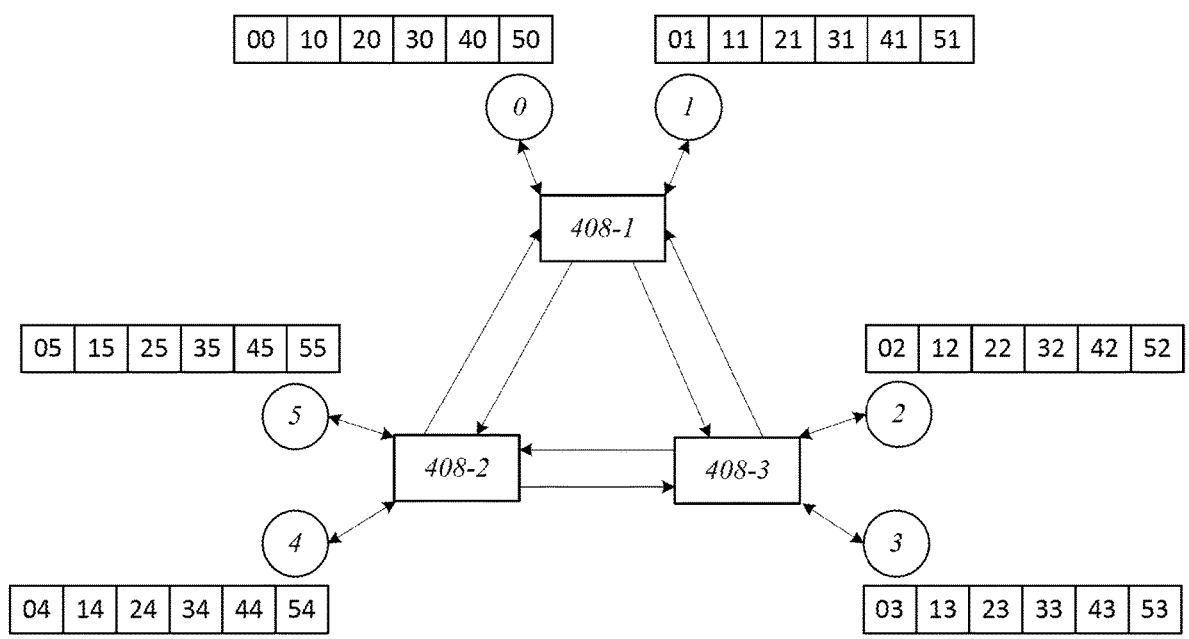

FIGS. 4A-4C illustrates one embodiment of a logic flow 400, which may be representative of operations that may be executed in various embodiments in conjunction with information distribution operations. The logic flow 400 may be representative of some or all of the operations that may be executed by one or more components of operating environments 100, 200, 300A, or 300B of FIGS. 1-3B, such as one or more compute nodes of distributed processing set 102 and/or one or more routers of network 110. In one or more embodiments, logic flow 400 may illustrate one or more portions of an AlltoAll collective operation. In various embodiments, in an AlltoAll collective operation, each compute node (or node) in distributed processing system 405 may send data to every other compute node. In some embodiments, distributed processing system 405 may be the same or similar as one or more of distributed processing systems 205, 305A, 305B. Embodiments are not limited in this context.

In many embodiments, AlltoAll may be highly communication intensive and therefore very challenging at scale. In some embodiments, large message AlltoAll may be performed using a ring algorithm. In one or more embodiments, a ring algorithm may include n−1 phases, where n is the number of compute nodes. In phase i, a compute node j may receive data of node (j−i−1)% n from compute node (j−1_% n), copy its portion of the data from the received data and forward the data to node (j+1)% n. In various embodiments, the cost of doing AlltoAll using the above ring algorithm may be $$(n-1)\left(\alpha + m\beta + \frac{m\gamma}{n}\right) \cong n\alpha + nm\beta + m\gamma,$$

wherein (n−1) is the number of phases in the algorithm and α+mβ is the message sending/receiving cost and $$\frac{m\gamma}{n}$$

is the data copying cost (m is the message size, that is, each node sends $$\frac{m}{n}$$

data to every other node). In various embodiments, this may lead to suboptimal network utilization. For instance, only n links may be utilized although many more links in the network remain unutilized. However, many embodiments described herein may improve network utilization by utilizing more than n links in a network.

As previously mentioned, AlltoAll may include every node in the distributed processing system 405 exchanging data. Accordingly, in FIG. 4A, node 0 may include data for itself, 00, data for node 1, 01, data for node 2, 02, data for node 3, 03, data for node 4, 04, and data for node 5, 05. Similarly, nodes 1-5 may include data for itself and every other node. In many embodiments, pseudo code for AlltoAll may include AlltoAll(sendbuf, recvbuf, comm). In some embodiments, sendbuf may refer to memory that contains data to be sent to other nodes. In various embodiments, recbuf may refer to memory in which a node will receive data from other nodes. In one or more embodiments, tmpbuf may refer to memory that is used to temporarily store data during performance of an AlltoAll operation. In some embodiments, comm may refer to a collection of nodes in the distributed system. For instance, the AlltoAll operation may be performed among the nodes in the collection of nodes.

In various embodiments described herein, AlltoAll may be implemented in two steps. For example, in step one (see FIG. 4B), a variant of ring based AlltoAll across ring sets using a ring based algorithm may be performed. In one or more embodiments, a node may send its entire data along the ring. In some embodiments, in each phase of this AlltoAll, instead of retaining the data for just itself, a node retains the data for all the nodes in its local set. In many embodiments, at the end of this step all the nodes in a local set together have all the data needed by the nodes in that local set. In some embodiments, pseudo code for this may include SwAlltoAll(sendbuf, tmpbuf, ringset, comm).

In one or more embodiments, the second step (see FIG. 4C) of AlltoAll may include performing an AlltoAll within each local set to get the desired data at every node. In various embodiments, there is not communication through the network during this step. In various such embodiments, compute nodes may communicate via a single router. In one or more embodiments, pseudo code for this may include AlltoAll(tmpbuf, recvbuf, localset).

A performance analysis of the above AlltoAll operations may include a step 1 cost and a step 2 cost. In various embodiments, the step 1 cost may include one or more of the following. Length of a ring in step 1 may be a. Size of the message copied in each phase of the ring algorithm may be $$\frac{pm}{n}.$$

For instance, because each node may also copy the data of all other nodes in its local set. Therefore, the costs of step 1 may be $$(a-1)\left(\alpha + m\beta + \frac{pm\gamma}{n}\right).$$

In some embodiments, the step 2 cost may include one or more of the following. In some such embodiments, this step may include an AlltoAll across nodes in a local set. In one or more embodiments, this may be done using a scattered send-receive algorithm. For instance, as there may be all-to-all connections inside a local set, scattered send-receive algorithms may not have network contention. In many embodiments, the total number of network phases may be p−1, and one local copying phase. The amount of data sent in each network phase may be $$\frac{am}{n}.$$

Therefore, costs of step 2 may be $$(p-1)\left(\alpha + \frac{am\beta}{n} + \frac{am\gamma}{n}\right) + \frac{am\gamma}{n}.$$

In various embodiments, assuming n>>1, n>>p, the total cost of the described method is step 1 cost plus step two cost, which equals (a+p)α+amβ+2mγ. In one or more embodiments, since n>>2 and γ<β, and, neglecting the α term for large messages, the described method is $$\sim \frac{n}{a} = p$$

times faster than a single ring algorithm. Further, unlike the single ring algorithm, the described method utilizes the AlltoAll connections across routers in a very efficient manner.

Another exemplary collective operation that one or more distributed processing systems described herein may utilize may be referred to as Reduce. In various embodiments, Reduce may find the max/min of a number set. In various such embodiments, the number set may be distributed among various compute nodes. In some embodiments, pseudo code for Reduce may include Reduce(data, recvbuf, root, comm). In some such embodiments, additional pseudo code with comments may include one or more of:
/*Get the router number of the root node and my node*/
root_switch=switchnum(root)
my_switch=switchnum(my_node)
/*Get the node in root_switch that belongs to my ring set*/
ring_root=node_in_ringset(root_switch, ringset)

In various embodiments, Reduce may be implemented via one or more methods. For instance, pseudo code with comments for a first method may include one or more of:
/*Step 1: Perform reduction in every ringset using a pipelined ring algorithm. At the end of this step, the root_switch may have the reduced data from all the switches distributed across its local set of nodes.*/
Reduce(data, recvbuf, ring_root, ringset)
/*Step 2: Perform reduction in the root_switch (e.g., local set of root node) to get the final reduced data at the root node. This may be performed using algorithms that are optimized for reduction within a switch.*/
if(root_switch==my_switch)
  Reduce(data, recvbuf, root, localset)

In another instance, pseudo code with comments for a second method to perform Reduce may include one or more of:
/*Step 1: Perform ReduceScatter in every switch (e.g., among nodes in local set)*/
ReduceScatter(data, chunk, localset)
/*Step 2: Perform reduce along ring sets using a pipelined ring algorithm (e.g., pipelined through communication pathways)*/
Reduce(chunk, recvbuf, ringroot, ringset)
/*Step 3: Perform Gather in root_switch*/
if(my_switch==root_switch)
  Gather(chunk, recvbuf, root, localset)

A performance analysis of the first Reduce method described above may include one or more of the following. In various embodiments, the cost (or time) of method 1 may include a step 1 cost and a step 2 cost. Step 1 may take (a−1)α+(a−1)(β+δ)s+max(β, δ)m, where δ is a reduction constant and s is segment size. Similarly step 2 may take time (p−1)α+(p−1)(β+δ)s+max(β, δ)m for the ring algorithm. Thus, the total time may be (a+p−2)(α+(β+γ)s)+2max(β, δ)m, referred to as (1). Various other ring algorithms may take (n−1)(α+(β+δ)s)+max(β, δ)m, referred to as (2). Accordingly, the analyzed Reduce method may have a lower cost than the various other ring algorithms whenever (1)>(2). In other words, whenever nα>max(β, δ)m, the analyzed Reduce method is faster (since n>>a, n>>p, m>>s).

In one or more embodiments, large message Reduce may be performed using ReduceScatter (α log n+mβ+mδ) followed by Gather (α log n+mβ). In such embodiments, total cost may be (2 log n)α+2mβ+nδ. In some embodiments, such as with larger messages, the latency (α) term may be negligible as compared to the bandwidth (β) and the reduction (δ) term. Therefore, the corresponding terms may be reduced to 2m*max(β,δ) for the analyzed Reduce method from (1) and 2mβ+mδ for the ReduceScatter followed by Gather method. In many embodiments, it may be noted that the cost analysis of the ReduceScatter followed by Gather method does not take into account the cost of network contention, which may be significant. On the other hand, the analyzed Reduce method and/or ring based approaches disclosed herein may be designed to avoid contention, leading to better performance in various scenarios.

FIGS. 5A-5D illustrates one embodiment of a logic flow 500, which may be representative of operations that may be executed in various embodiments in conjunction with information distribution. The logic flow 500 may be representative of some or all of the operations that may be executed by one or more components of operating environments 100, 200, 300A, or 300B of FIGS. 1-3B, such as one or more compute nodes of distributed processing set 102 and/or one or more routers of network 110. In one or more embodiments, logic flow 500 may illustrate one or more portions of a Broadcast collective operation. In various embodiments, in a Broadcast collective operation, a dataset 512 may be communicated from a root node 510-1 to every other compute node in the distributed processing system 505. In some embodiments, distributed processing system 505 may be the same or similar as one or more of distributed processing systems 205, 305A, 305B, 405. Embodiments are not limited in this context.

Figure 5A:
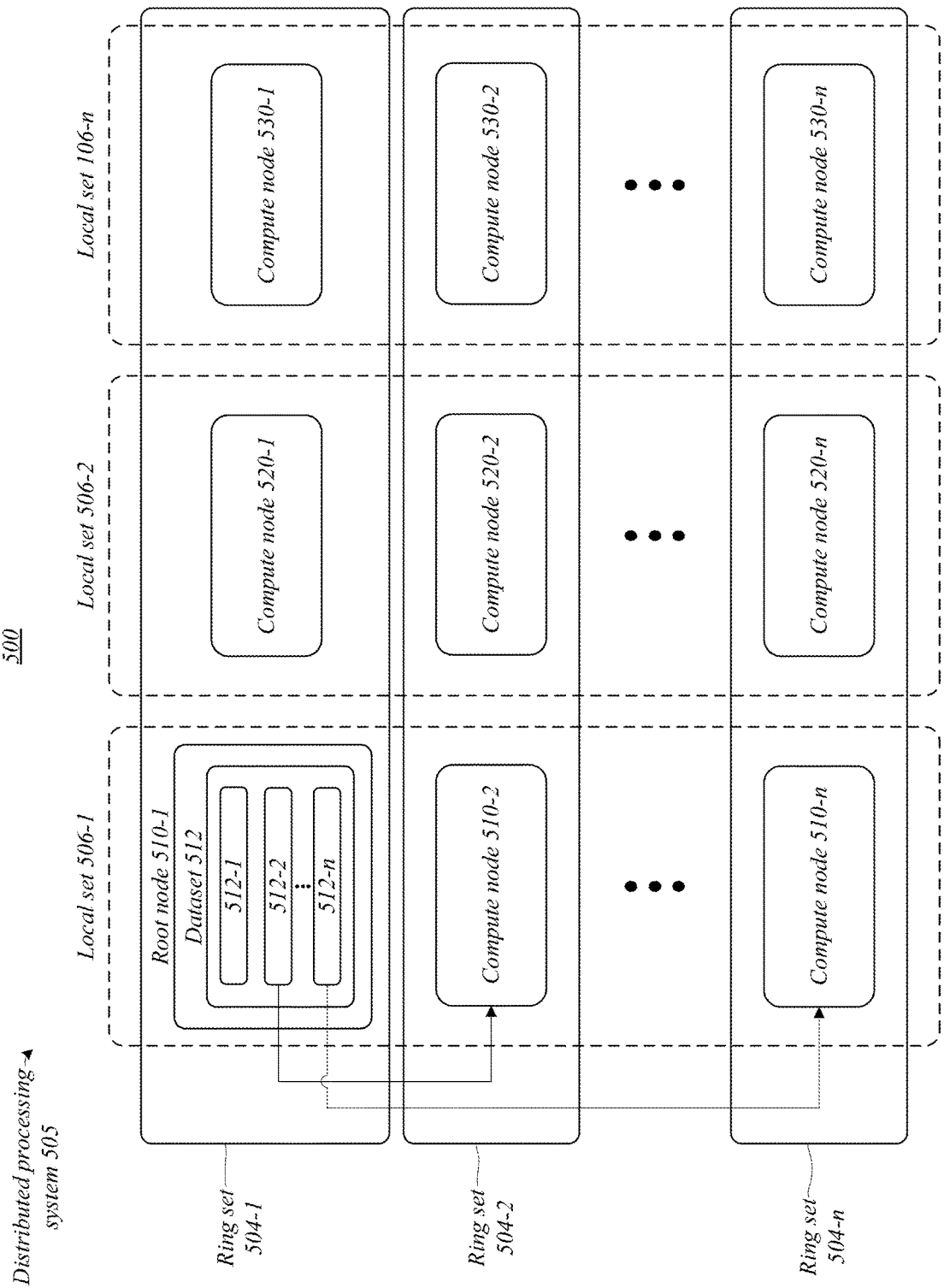
Figure 5C:
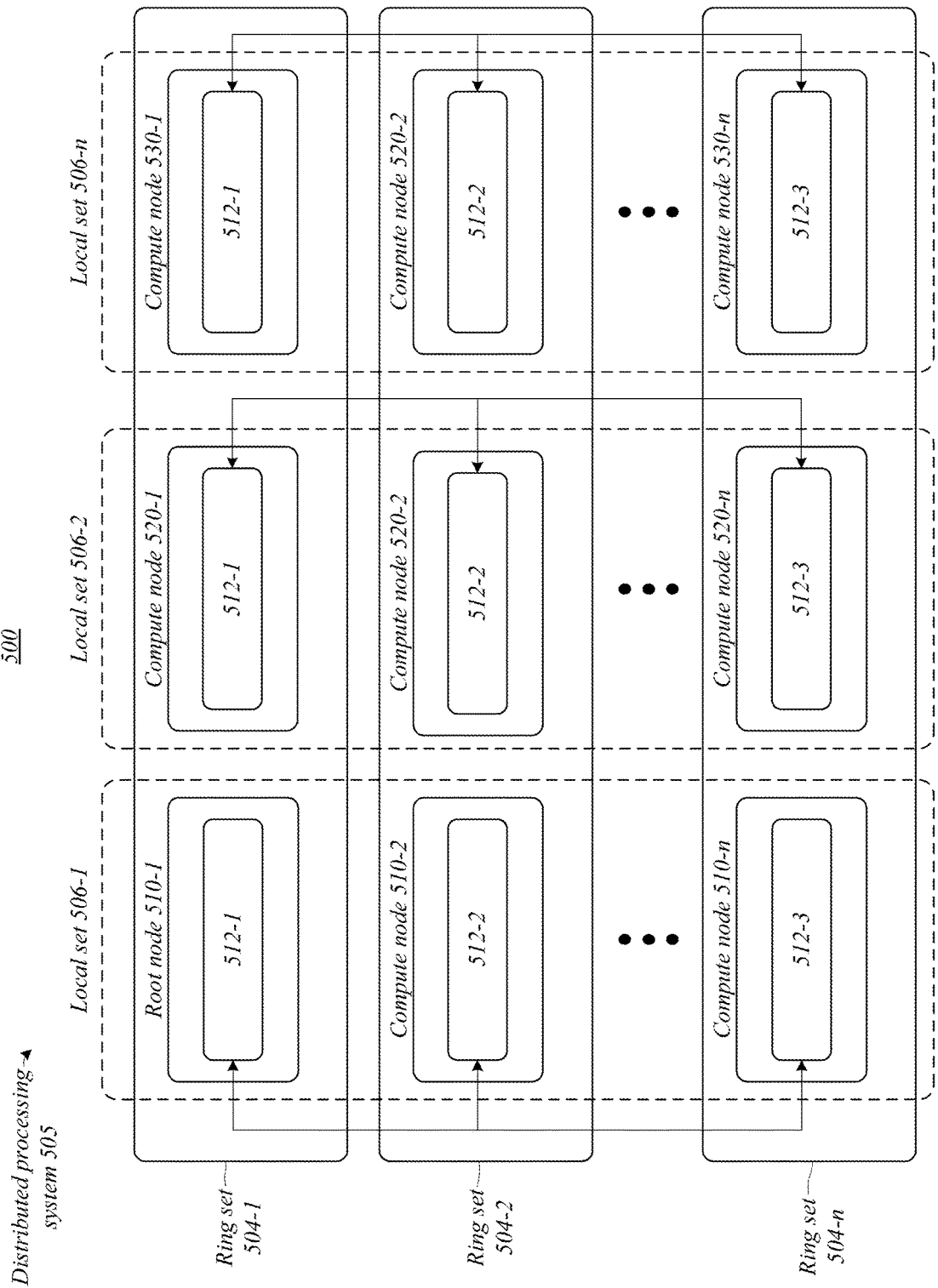
Figure 5D:
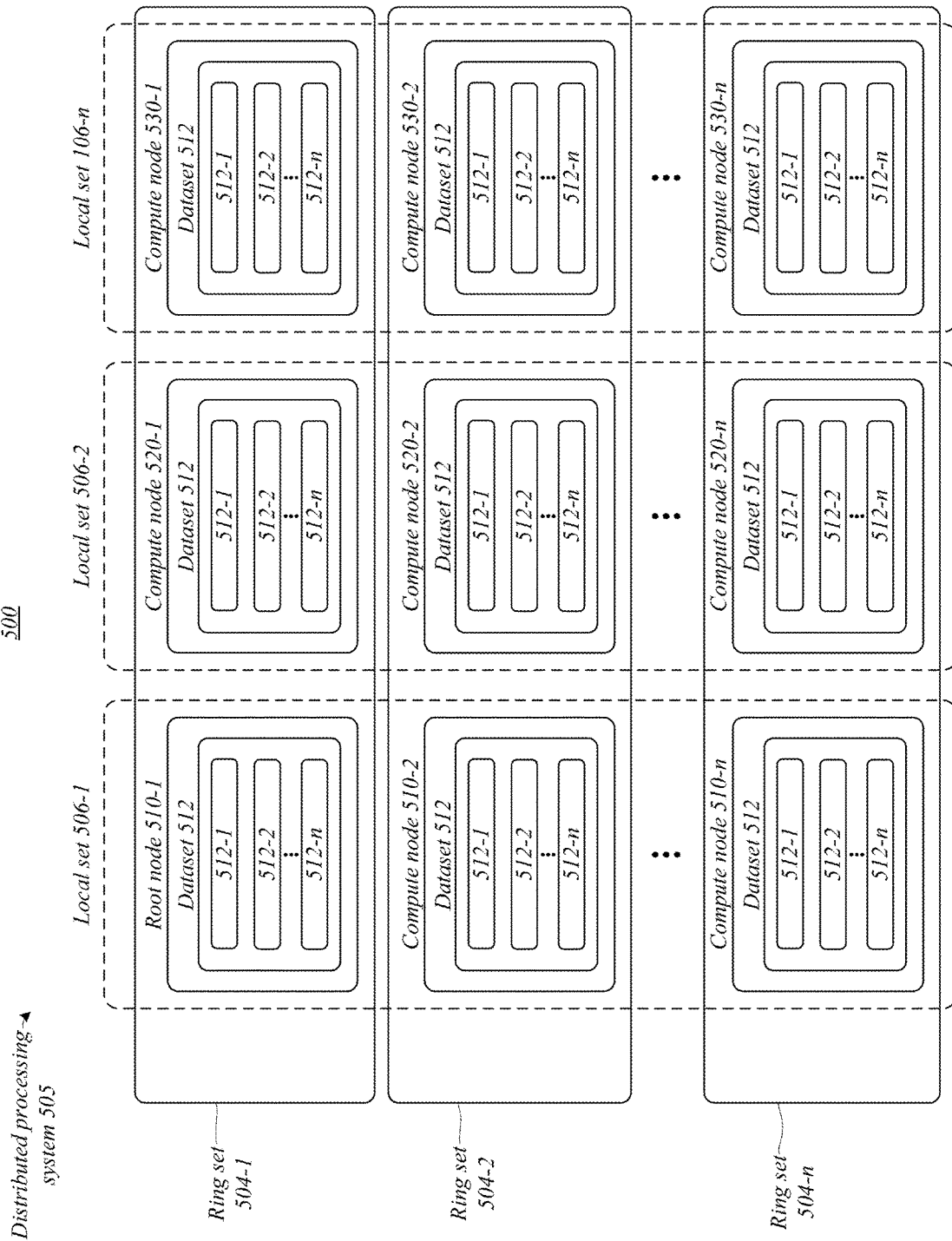

In various embodiments, in FIG. 5A, root node 510-1 may distribute portions of data set 512 among local set 506-1. For instance, portion 512-2 of data set 512 may be communicated/distributed to compute node 510-2 and portion 512-n to compute node 510-n. Referring now to FIG. 5B, portion 512-1 may be pushed through ring set 504-1, portion 512-2 may be pushed through ring set 504-2, and portion 512-n may be pushed through ring set 504-1. Proceeding to FIG. 5C, the nodes of each local set 506 may distribute the respective portions of dataset 512 among themselves. Concluding with FIG. 5D, once the nodes of each local set distribute the respective portions of dataset 512 among themselves, each compute node may have a copy of all portions of dataset 512.

In some embodiments, pseudo code with comments for this Broadcast operation may include one or more of:
Bcast(data, root, comm)
/*Get the switch number of the root and my node*/
root_switch=switchnum(root)
my_switch=switchnum(my_node)
/*Step 1: Scatter the data to be broadcasted across nodes in root_switch (e.g., local set of root node)*/
if(root_switch==my_switch)
  Scatter(data, chunk, root, localset)
/*Each node in root_switch broadcasts their chunk across nodes in their ring set. Get the node in root_switch that belongs to my ring*/
ring_root=node_in_ringset(root_switch, ringset)
Bcast(chunk, ring_root, ringset) /*Broadcast chunk using pipelined ring algorithm*/
/*Step 3: Finally perform Allgather in every switch to get the full data*/
Allgather(chunk, recvbuf, localset)

In various embodiments, an AllReduce collective operation may be implemented via one or more methods. For instance, pseudo code with comments for a first method may include one or more of:
Allreduce(data, recvbuf, comm)
/*Step 1: Perform a ring based pipelined allreduce across ring sets*/
Allreduce(data, recvbuf, ringset)
/*Step 2: Perform Allreduce inside each local set*/
Allreduce(data, recvbuf, localset)

In another instance, pseudo code with comments for a second method may include one or more of:
/*Step 1: Perform ReduceScatter in every switch (e.g., among nodes in local set)*/
ReduceScatter(data, chunk, localset)
/*Step 2: Perform Allreduce along ring sets using a pipelined ring algorithm (e.g., pipelined through communication pathways)*/
Allreduce(chunk, chunk, localset)
/*Step 3: Perform Allgather in every switch*/
Allgather(chunk, recvbuf, localset)

Applications of the systems, devices, and methods described herein may apply to numerous fields. For instance, in deep learning and high performance computing (HPC), highly efficient frameworks and libraries for applications may be critical. Therefore, the improved performance of information distribution operations provided by embodiments described herein, such as in collective messaging, may be critical to use in both HPC and deep learning domains. Additionally, embodiments may provide highly scalable collectives that can adapt to changing machine and data sizes. In some embodiments, for example, the information distribution techniques disclosed herein may provide advantages in applications including parallel frameworks for machine learning. Improvements may also be realized in large message AlltoAll collective operations, which are extensively used by input/output (I/O) libraries to write data to a distributed file system. In some embodiments, a distributed processing system may include one or more portions of a distributed file system. In various embodiments, techniques disclosed herein may be critical in obtaining satisfactory performance for data analytics and HPC applications on various data centers and/or supercomputers. For example, collective performance may be required to meet minimum standards as part of a request for proposals (RFP).

FIG. 6 illustrates one embodiment of a logic flow 600, which may be representative of operations that may be executed in various embodiments in conjunctions with distributed computing operations. The logic flow 600 may be representative of some or all of the operations that may be executed by one or more components described herein, such as distributed processing system 205. The embodiments are not limited in this context.

In the illustrated embodiments, logic flow 600 may begin at block 602. At block 602 "identify a dataset for distributed computing operations among a distributed processing set of compute nodes" a dataset for distributed computing operations among a set of compute nodes may be identified. For example, dataset 512 may be identified by root node 510-1 for distributed computing operations within distributed processing system 505. In some embodiments, the portion of the dataset distributed to the compute node in the ring set may include the portion of the dataset distributed to the compute node in the local set. For instance, distribution among the local set and distribution among the ring set may include an AlltoAll collective operation. In various embodiments, identification of the dataset may be part of one or more collective operations described herein.

Continuing to block 604, a first portion of the dataset may be distributed to a second compute node in a local set that includes the first compute node, the local set comprising a first subset of the distributed processing set, wherein each compute node in the local set is connected to a network with a common router. For example, root node 510-1 may distribute a first portion 512-2 of dataset 512 to compute node 510-2 in local set 506-1. In some embodiments, distribution of the portion of data within the local set may be part of one or more distributed computing operations described herein. For instance, the distribution within the local set may be part of one or more collective operations, such as AlltoAll, Reduce, Allreduce, or Broadcast. In various embodiments, a different portion of the dataset may be distributed to each compute node in the local set. In one or more embodiments, all the compute nodes in the local set may be connected to network 110 via router 108-2, for example.

Continuing to block 606, a second portion of the dataset may be distributed to a third compute node in a ring set that includes the first compute node, the ring set comprising a second subset of the distributed processing set, wherein each compute node in the ring set is connected to a network with a separate router. For example, root node 510-1 may distribute a first portion 512-1 of dataset 512 to compute node 520-1 in ring set 504-1. In some embodiments, distribution of the portion of data within the ring set may be part of one or more distributed computing operations described herein. For instance, the distribution within the ring set may be part of one or more collective operations, such as AlltoAll, Reduce, Allreduce, or Broadcast. In various embodiments, the same portion of the dataset may be distributed to each compute node in the ring set. In various such embodiments, the third compute node may retain parts of the second portion of the dataset that are associated with a compute node in another local set that does not include the first or second compute nodes. In some such embodiments, the third compute node may distribute respective sections of the retained parts of the second portion of the dataset to the respective associated compute nodes in the other local set. In one or more embodiments, all the compute nodes in the ring set may be connected to network 110 via different routers. For example, the ring set may include compute node 210-1 connected via router 108-1, compute node 220-1 connected via router 108-2, and compute node 230-1 connected via router 108-3.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flows or operations described herein, such as with respect to logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
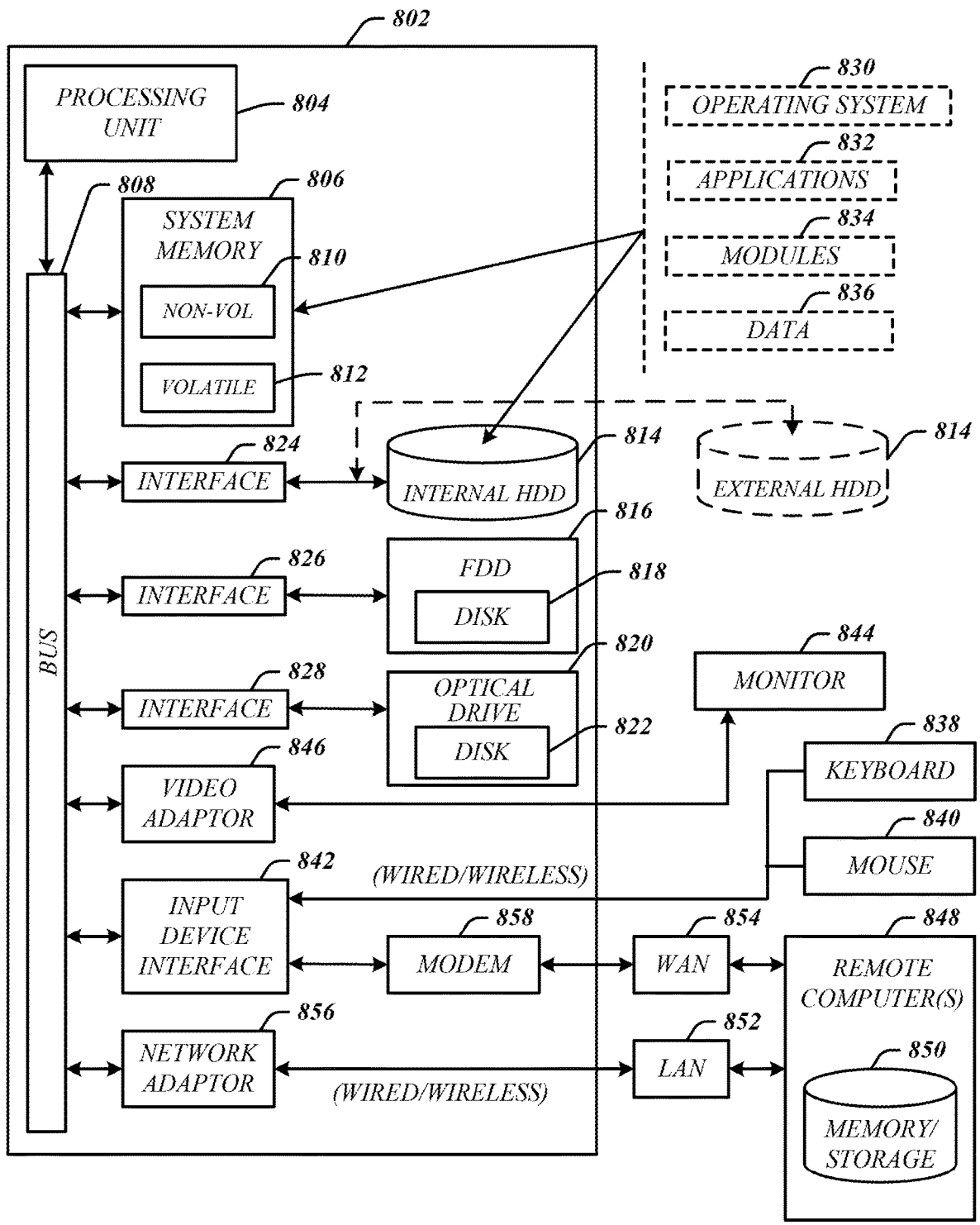
FIG. 8 illustrates an embodiment of a computing architecture.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of a distributed processing system that implements or utilizes one or more components described herein. In some embodiments, computing architecture 800 may be representative, for example, of a compute node in a distributed processing system described herein that implements or utilizes one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. In some embodiments, system memory 806 may include main memory. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of compute nodes described herein, such as compute nodes 210, 220, 230.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 994 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more migrations may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 1358, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
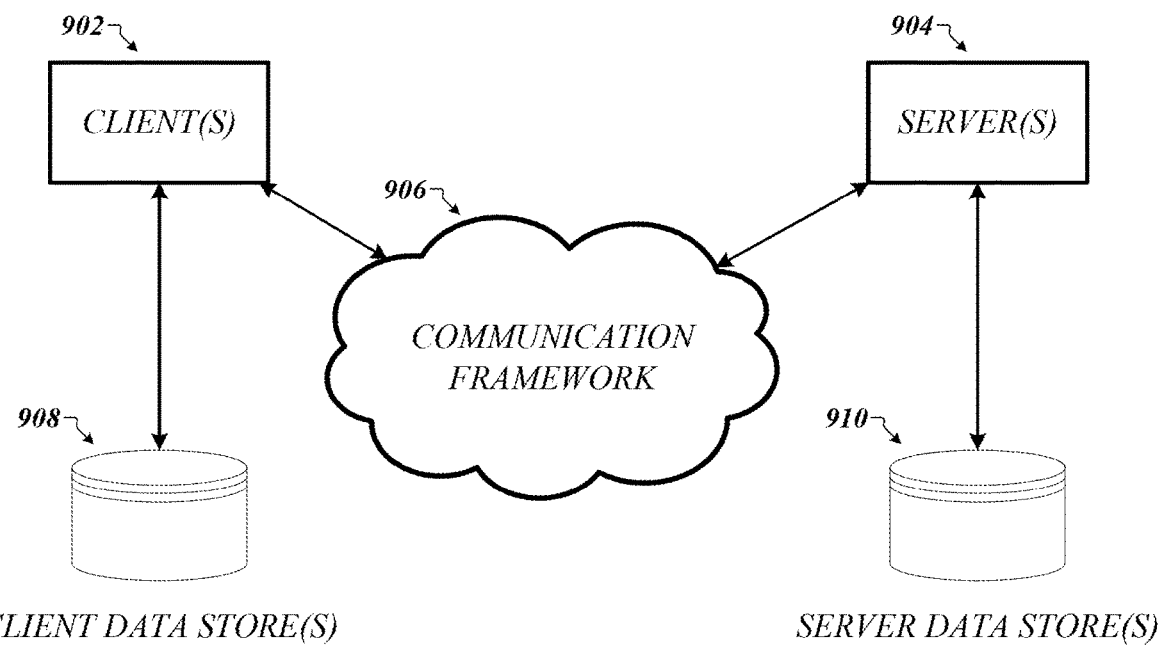
FIG. 9 illustrates an embodiment of a communications architecture.

FIG. 9 illustrates a block diagram of an exemplary communications architecture 900 suitable for implementing various embodiments as previously described, such as virtual machine migration. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. In some embodiments communications architecture may include one or more portions of network 110 and/or distributed processing system 205. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described herein, and storage medium 700 of FIG. 7 in conjunction with storage of data received from any one of clients 902 on any of server data stores 910. In one or more embodiments, one or more of client data store(s) 908 or server data store(s) 910 may include memory accessible to one or more compute nodes in distributed processing set 102.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus for collective operations, the apparatus comprising: a memory; and logic for a first compute node, at least a portion of the logic implemented in circuitry coupled to the memory, the logic to: identify a dataset for distributed computing operations among a distributed processing set of compute nodes; distribute a first portion of the dataset to a second compute node in a local set, the local set comprising a first subset of the distributed processing set and including the first and second compute nodes, wherein each compute node in the local set is connected to a network with a common router; and distribute a second portion of the data set to a third compute node in a ring set that includes the first compute node, the ring set comprising a second subset of the distributed processing set of compute nodes, wherein each compute node in the ring set is connected to the network with a separate router.

Example 2 includes the subject matter of Example 1, the ring set comprising an edge disjoint ring.

Example 3 includes the subject matter of Example 1, the logic to divide the data set into a number of portions corresponding to a number of compute nodes in the local set.

Example 4 includes the subject matter of Example 1, the logic to: receive a second dataset from a fourth compute node, the fourth compute node included in the ring set; and retain a first portion of the second dataset for the first compute node and a second portion of the second dataset for the second compute node.

Example 5 includes the subject matter of Example 4, the logic to distribute the second portion of the second dataset to the second compute node.

Example 6 includes the subject matter of Example 4, the logic to distribute a third portion of the second data set to the third compute node.

Example 7 includes the subject matter of Example 1, the distributed computing operations comprising collective operations.

Example 8 includes the subject matter of Example 1, the ring set and the local set comprising exactly one common compute node, wherein the exactly one common compute node is the first compute node.

Example 9 includes the subject matter of Example 1, the network comprising a multi-tier direct topology or a dragonfly topology.

Example 10 includes the subject matter of Example 1, the logic to push the second portion of the dataset through the ring set.

Example 11 includes the subject matter of Example 1, comprising a second ring set that includes the second compute node and a fourth compute node, wherein a second local set includes the third and fourth compute nodes.

Example 12 includes the subject matter of Example 1, the logic to: distribute the first portion of the dataset to the second compute node via a first router; and distribute the second portion of the dataset to the third compute node through the network via the first router and a second router.

Example 13 includes the subject matter of Example 1, the logic to determine a number of compute nodes in the ring set based on a number of routers accessible via the network and connected to one or more compute nodes in the distributed processing set.

Example 14 includes the subject matter of Example 1, the logic to determine a size of each portion of the data set based on a number of compute nodes in the ring set.

Example 15 is at least one non-transitory computer-readable medium comprising a set of instructions that, in response to being executed by a processor circuit, cause the processor circuit to: identify, at a first compute node, a dataset for distributed processing operations among a distributed processing set of compute nodes; distribute a first portion of the dataset to a second compute node in a local set that includes the first compute node, the local set comprising a first subset of the distributed processing set, wherein each compute node in the local set is connected to a network with a common router; and distribute a second portion of the data set to a third compute node in a ring set that includes the first compute node, the ring set comprising a second subset of the distributed processing set of compute nodes, wherein each compute node in the ring set is connected to the network with a separate router.

Example 16 includes the subject matter of Example 15, the ring set comprising an edge disjoint ring.

Example 17 includes the subject matter of Example 15, comprising instructions that, in response to being executed by the processor circuit, cause the processor circuit to divide the data set into a number of portions corresponding to a number of compute nodes in the local set.

Example 18 includes the subject matter of Example 15, comprising instructions that, in response to being executed by the processor circuit, cause the processor circuit to: receive a second dataset from a fourth compute node, the fourth compute node included in the ring set; and retain a first portion of the second dataset for the first compute node and a second portion of the second dataset for the second compute node.

Example 19 includes the subject matter of Example 18, comprising instructions that, in response to being executed by the processor circuit, cause the processor circuit to distribute the second portion of the second dataset to the second compute node.

Example 20 includes the subject matter of Example 18, comprising instructions that, in response to being executed by the processor circuit, cause the processor circuit to distribute a third portion of the second data set to the third compute node.

Example 21 includes the subject matter of Example 15, the distributed computing operations comprising collective operations.

Example 22 includes the subject matter of Example 15, the ring set and the local set comprising exactly one common compute node, wherein the exactly one common compute node is the first compute node.

Example 23 includes the subject matter of Example 15, the network comprising a multi-tier direct topology or a dragonfly topology.

Example 24 includes the subject matter of Example 15, comprising instructions that, in response to being executed by the processor circuit, cause the processor circuit to push the second portion of the dataset through the ring set.

Example 25 includes the subject matter of Example 15, comprising a second ring set that includes the second compute node and a fourth compute node, wherein a second local set includes the third and fourth compute nodes.

Example 26 includes the subject matter of Example 15, comprising instructions that, in response to being executed by the processor circuit, cause the processor circuit to: distribute the first portion of the dataset to the second compute node via a first router; and distribute the second portion of the dataset to the third compute node through the network via the first router and a second router.

Example 27 includes the subject matter of Example 15, comprising instructions that, in response to being executed by the processor circuit, cause the processor circuit to determine a number of compute nodes in the ring set based on a number of routers accessible via the network and connected to one or more compute nodes in the distributed processing set.

Example 28 includes the subject matter of Example 15, comprising instructions that, in response to being executed by the processor circuit, cause the processor circuit to determine a size of each portion of the data set based on a number of compute nodes in the ring set.

Example 29 is a computer-implemented method, comprising: identifying, at a first compute node, a dataset for distributed computing operations among a distributed processing set of compute nodes; distributing a first portion of the dataset to a second compute node in a local set that includes the first compute node, the local set comprising a first subset of the distributed processing set and including the first and second compute nodes, wherein each compute node in the local set is connected to a network with a common router; and distributing a second portion of the data set to a third compute node in a ring set that includes the first compute node, the ring set comprising a second subset of the distributed processing set of compute nodes, wherein each compute node in the ring set is connected to the network with a separate router.

Example 30 includes the subject matter of Example 29, the ring set comprising an edge disjoint ring.

Example 31 includes the subject matter of Example 29, comprising dividing the data set into a number of portions corresponding to a number of compute nodes in the local set.

Example 32 includes the subject matter of Example 29, comprising: receiving a second dataset from a fourth compute node, the fourth compute node included in the ring set; and retaining a first portion of the second dataset for the first compute node and a second portion of the second dataset for the second compute node.

Example 33 includes the subject matter of Example 32, comprising distributing the second portion of the second dataset to the second compute node.

Example 34 includes the subject matter of Example 32, comprising distributing a third portion of the second data set to the third compute node.

Example 35 includes the subject matter of Example 29, the distributed computing operations comprising collective operations.

Example 36 includes the subject matter of Example 29, the ring set and the local set comprising exactly one common compute node, wherein the exactly one common compute node is the first compute node.

Example 37 includes the subject matter of Example 29, the network comprising a multi-tier direct topology or a dragonfly topology.

Example 38 includes the subject matter of Example 29, comprising pushing the second portion of the dataset through the ring set.

Example 39 includes the subject matter of Example 29, comprising a second ring set that includes the second compute node and a fourth compute node, wherein a second local set includes the third and fourth compute nodes.

Example 40 includes the subject matter of Example 29, comprising: distributing the first portion of the dataset to the second compute node via a first router; and distributing the second portion of the dataset to the third compute node through the network via the first router and a second router.

Example 41 includes the subject matter of Example 29, comprising determining a number of compute nodes in the ring set based on a number of routers accessible via the network and connected to one or more compute nodes in the distributed processing set.

Example 42 includes the subject matter of Example 29, comprising determining a size of each portion of the data set based on a number of compute nodes in the ring set.

Example 43 is an apparatus for collective operations, the apparatus comprising: means for identifying, at a first compute node, a dataset for distributed computing operations among a distributed processing set of compute nodes; means for distributing a first portion of the dataset to a second compute node in a local set that includes the first compute node, the local set comprising a first subset of the distributed processing set and including the first and second compute nodes, wherein each compute node in the local set is connected to a network with a common router; and means for distributing a second portion of the data set to a third compute node in a ring set that includes the first compute node, the ring set comprising a second subset of the distributed processing set of compute nodes, wherein each compute node in the ring set is connected to the network with a separate router.

Example 44 includes the subject matter of Example 43, the ring set comprising an edge disjoint ring.

Example 45 includes the subject matter of Example 43, comprising means for dividing the data set into a number of portions corresponding to a number of compute nodes in the local set.

Example 46 includes the subject matter of Example 43, comprising: means for receiving a second dataset from a fourth compute node, the fourth compute node included in the ring set; and means for retaining a first portion of the second dataset for the first compute node and a second portion of the second dataset for the second compute node.

Example 47 includes the subject matter of Example 46, comprising means for distributing the second portion of the second dataset to the second compute node.

Example 48 includes the subject matter of Example 46, comprising means for distributing a third portion of the second data set to the third compute node.

Example 49 includes the subject matter of Example 43, the distributed computing operations comprising collective operations.

Example 50 includes the subject matter of Example 43, the ring set and the local set comprising exactly one common compute node, wherein the exactly one common compute node is the first compute node.

Example 51 includes the subject matter of Example 43, the network comprising a multi-tier direct topology or a dragonfly topology.

Example 52 includes the subject matter of Example 43, comprising means for pushing the second portion of the dataset through the ring set.

Example 53 includes the subject matter of Example 43, comprising a second ring set that includes the second compute node and a fourth compute node, wherein a second local set includes the third and fourth compute nodes.

Example 54 includes the subject matter of Example 43, comprising: means for distributing the first portion of the dataset to the second compute node via a first router; and means for distributing the second portion of the dataset to the third compute node through the network via the first router and a second router.

Example 55 includes the subject matter of Example 43, comprising means for determining a number of compute nodes in the ring set based on a number of routers accessible via the network and connected to one or more compute nodes in the distributed processing set.

Example 56 includes the subject matter of Example 43, comprising means for determining a size of each portion of the data set based on a number of compute nodes in the ring set.

Example 57 is an apparatus for distributed processing, the apparatus comprising: a memory; and logic for a first compute node, at least a portion of the logic implemented in circuitry coupled to the memory, the logic to: identify, at the first compute node, a first portion of a dataset received from a second compute node, the first and second compute nodes in a ring set, the ring set comprising two or more compute nodes connected to a network, wherein each of the two or more compute nodes in the ring set utilize separate routers to connect to the network; communicate the first portion of the dataset to a third compute node, the first and third compute nodes in a local set, the local set comprising two or more computer nodes connected to the network, wherein each of the two or more compute nodes in the local set utilize a common router to connect to the network; identify, at the first compute node, a second portion of the dataset received from the third compute node; and perform a distributed processing operation based on the first and second portions of the dataset.

Example 58 is an apparatus for collective operations, the apparatus comprising: a memory; and logic, at least a portion of the logic implemented in circuitry coupled to the memory, the logic to: receive a first portion of a dataset via a network; distribute the first portion of the dataset to a first compute node; receive a second portion of the dataset via the network; distribute the second portion of the dataset to a second compute node; relay the first portion of data from the first compute node to the second compute node; and relay the second portion of data from the second compute node to the first compute node.

Example 59 is a system, comprising: a first router to communicatively couple a first set of compute nodes to a network, the first set of compute nodes comprising a first compute node and a second compute node; a second router to communicatively couple a second set of compute nodes to the network, the second set of compute nodes comprising a third compute node and a fourth compute node, wherein the first compute node and the third compute node form a first ring and the second compute node and the fourth compute node form a second ring, the first compute node comprising a dataset including a first portion and a second portion; the first compute node to send the second portion to the second compute node via the first router and to send the first portion to the third compute node through the network via the first router and the second router; the second compute node to send the second portion to the fourth compute node through the network via the first router and the second router; the third compute node to send the first portion to the fourth compute node via the second router; and the fourth compute node to send the second portion to the third compute node via the second router.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
   circuitry and a memory device comprising instructions that when executed by the circuitry cause the circuitry to:
   identify a dataset for distributed computing operations among a distributed processing set of compute nodes,
   distribute a first portion of the dataset to a second compute node in a local set that includes a first compute node, the local set comprising a first subset of the distributed processing set, wherein each compute node in the local set is connected to a network with a common router,
   distribute a second portion of the dataset to a third compute node in a ring set that includes the first compute node, the ring set comprising a second subset of the distributed processing set of compute nodes, wherein each compute node in the ring set is connected to the network with a respective one of a plurality of separate routers,
   receive a second dataset from a fourth compute node, the fourth compute node included in the ring set, and retain a first portion of the second dataset for the first compute node and a second portion of the second dataset for the second compute node,
   wherein the ring set and the local set comprise a common compute node, wherein the common compute node is the first compute node, and wherein the common router is a one of the plurality of separate routers.

2. The apparatus of claim 1, the ring set comprising an edge disjoint ring.

3. The apparatus of claim 1, the instructions, when executed by the circuitry cause the circuitry to divide the dataset into a number of portions corresponding to a number of compute nodes in the local set.

4. The apparatus of claim 1, the instructions, when executed by the circuitry cause the circuitry to distribute the second portion of the second dataset to the second compute node.

5. The apparatus of claim 1, the instructions, when executed by the circuitry cause the circuitry to distribute a third portion of the second dataset to the third compute node.

6. The apparatus of claim 1, the distributed computing operations comprising collective operations.

7. The apparatus of claim 1, the network comprising a multi-tier direct topology or a dragonfly topology.

8. The apparatus of claim 1, the instructions, when executed by the circuitry cause the circuitry to push the second portion of the dataset through the ring set.

9. The apparatus of claim 1, comprising a second ring set that includes the second compute node and a fourth compute node, wherein a second local set includes the third and fourth compute nodes.

10. The apparatus of claim 1, the instructions, when executed by the circuitry cause the circuitry to:
    distribute the first portion of the dataset to the second compute node via a first router; and
    distribute the second portion of the dataset to the third compute node through the network via the first router and a second router.

11. The apparatus of claim 1, the instructions, when executed by the circuitry cause the circuitry to determine a number of compute nodes in the ring set based on a number of routers accessible via the network and connected to one or more compute nodes in the distributed processing set.

12. The apparatus of claim 1, the instructions, when executed by the circuitry cause the circuitry to determine a size of each portion of the dataset based on a number of compute nodes in the ring set.

13. At least one non-transitory computer-readable medium comprising a set of instructions that, in response to being executed by a processor circuit, cause the processor circuit to:
    identify, at a first compute node, a dataset for distributed computing operations among a distributed processing set of compute nodes;
    distribute a first portion of the dataset to a second compute node in a local set that includes the first compute node, the local set comprising a first subset of the distributed processing set, wherein each compute node in the local set is connected to a network with a common router;
    distribute a second portion of the dataset to a third compute node in a ring set that includes the first compute node, the ring set comprising a second subset of the distributed processing set of compute nodes, wherein each compute node in the ring set is connected to the network with a separate router;

receive a second dataset from a fourth compute node, the fourth compute node included in the ring set; and retain a first portion of the second dataset for the first compute node and a second portion of the second dataset for the second compute node;

wherein the ring set and the local set comprise a common compute node, wherein the common compute node is the first compute node, and the first compute node is connected to both the common router and the separate router.

14. The at least one non-transitory computer-readable medium of claim 13, the ring set comprising an edge disjoint ring.

15. The at least one non-transitory computer-readable medium of claim 13, comprising instructions that, in response to being executed by the processor circuit, cause the processor circuit to divide the dataset into a number of portions corresponding to a number of compute nodes in the local set.

16. The at least one non-transitory computer-readable medium of claim 13, comprising instructions that, in response to being executed by the processor circuit, cause the processor circuit to distribute the second portion of the second dataset to the second compute node.

17. The at least one non-transitory computer-readable medium of claim 13, comprising instructions that, in response to being executed by the processor circuit, cause the processor circuit to distribute a third portion of the second dataset to the third compute node.

18. A computer-implemented method, comprising:
identifying, at a first compute node, a dataset for distributed computing operations among a distributed processing set of compute nodes;

distributing a first portion of the dataset to a second compute node in a local set that includes the first compute node, the local set comprising a first subset of the distributed processing set, wherein each compute node in the local set is connected to a network with a common router;

distributing a second portion of the dataset to a third compute node in a ring set that includes the first compute node, the ring set comprising a second subset of the distributed processing set of compute nodes, wherein each compute node in the ring set is connected to the network with a separate router;

receive a second dataset from a fourth compute node, the fourth compute node included in the ring set; and retain a first portion of the second dataset for the first compute node and a second portion of the second dataset for the second compute node, wherein the ring set and the local set comprise a common compute node, wherein the common compute node is the first compute node, and the first compute node is connected to both the common router and the separate router.

19. The computer-implemented method of claim 18, comprising pushing the second portion of the dataset through the ring set.

20. The computer-implemented method of claim 18, comprising:
distributing the first portion of the dataset to the second compute node via a first router; and
distributing the second portion of the dataset to the third compute node through the network via the first router and a second router.

21. The computer-implemented method of claim 18, comprising determining a number of compute nodes in the ring set based on a number of routers accessible via the network and connected to one or more compute nodes in the distributed processing set.

22. The computer-implemented method of claim 18, comprising determining a size of each portion of the dataset based on a number of compute nodes in the ring set.

* * * * *